(12) United States Patent
Yamamoto et al.

(10) Patent No.: US 12,621,105 B2
(45) Date of Patent: May 5, 2026

(54) COMMUNICATION DEVICE AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Xuan Tuong Tran, Singapore (SG); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 343 days.

(21) Appl. No.: 18/552,862

(22) PCT Filed: Nov. 25, 2021

(86) PCT No.: PCT/JP2021/043175
§ 371 (c)(1),
(2) Date: Sep. 27, 2023

(87) PCT Pub. No.: WO2022/208989
PCT Pub. Date: Oct. 6, 2022

(65) Prior Publication Data
US 2024/0195570 A1 Jun. 13, 2024

(30) Foreign Application Priority Data
Mar. 30, 2021 (JP) ................................. 2021-057549

(51) Int. Cl.
| | |
|---|---|
| *H04L 1/08* | (2006.01) |
| *H04L 5/00* | (2006.01) |
| *H04W 72/0446* | (2023.01) |
| *H04W 72/20* | (2023.01) |

(52) U.S. Cl.
CPC .............. *H04L 5/0051* (2013.01); *H04L 1/08* (2013.01); *H04W 72/0446* (2013.01); *H04W 72/20* (2023.01)

(58) Field of Classification Search
CPC ........ H04L 5/0051; H04L 1/08; H04W 72/20; H04W 72/0446
See application file for complete search history.

(56) References Cited

U.S. PATENT DOCUMENTS

2023/0246778 A1* 8/2023 Li ........................... H04L 1/189
370/329

OTHER PUBLICATIONS

3GPP TS 23.501 V16.1.0, "3rd Generation Partnership Project; Technical Specification Group Services and System Aspects; System Architecture for the 5G System; Stage 2 (Release 16)," Jun. 2019, 367 pages.

(Continued)

*Primary Examiner* — Melvin C Marcelo
(74) *Attorney, Agent, or Firm* — Seed Intellectual Property Law Group LLP

(57) ABSTRACT

According to the present invention, a terminal comprises: a control circuit that makes different reference signal settings for multiple sections in which signals are repeatedly transmitted; and a transmission circuit that repeatedly transmits signals on the basis of the reference signal settings.

12 Claims, 28 Drawing Sheets

(56)         References Cited

OTHER PUBLICATIONS

3GPP TS 38.104 V15.12.0, "3rd Generation Partnership Project; Technical Specification Group Radio Access Network; NR; Base Station (BS) radio transmission and reception (Release 15)," Dec. 2020, 238 pages.
3GPP TS 38.211 V15.6.0, "3rd Generation Partnership Project; Technical Specification Group Radio Access Network; NR; Physical channels and modulation (Release 15)," Jun. 2019, 97 pages.
3GPP TS 38.211 V16.4.0, "3rd Generation Partnership Project; Technical Specification Group Radio Access Network; NR; Physical channels and modulation (Release 16)," Dec. 2020, 133 pages.
3GPP TS 38.212 V16.4.0, "3rd Generation Partnership Project; Technical Specification Group Radio Access Network; NR; Multiplexing and channel coding (Release 16)," Dec. 2020, 152 pages.
3GPP TS 38.213 V16.4.0, "3rd Generation Partnership Project; Technical Specification Group Radio Access Network; NR; Physical layer procedures for control (Release 16)," Dec. 2020, 181 pages.
3GPP TS 38.214 V16.4.0, "3rd Generation Partnership Project; Technical Specification Group Radio Access Network; NR; Physical layer procedures for data (Release 16)," Dec. 2020, 169 pages.
3GPP TS 38.300 V15.6.0, "3rd Generation Partnership Project; Technical Specification Group Radio Access Network; NR; Nr and NG-RAN Overall Description; Stage 2 (Release 15)," Jun. 2019, 99 pages.
3GPP TS 38.331 V16.3.1, "3rd Generation Partnership Project; Technical Specification Group Radio Access Network; NR; Radio Resource Control (RRC) protocol specification (Release 16)," Jan. 2021, 932 pages.

China Telecom, "New WID on NR coverage enhancements," RP-202928, Agenda Item: 9.1.1, 3GPP TSG RAN meeting #90e, Electronic Meeting, Dec. 7-11, 2020, 5 pages.
International Search Report dated Feb. 22, 2022, for the corresponding International Patent Application No. PCT/JP2021/043175, 2 pages.
International Telecommunication Union, "IMT Vision—Framework and overall objectives of the future development of IMT for 2020 and beyond," Recommendation ITU-R M.2083-0, Sep. 2015, 21 pages.
Qualcomm Incorporated, "Potential coverage enhancement techniques for PUSCH," R1-2009729, Agenda Item: 8.8.2.1, 3GPP TSG-RAN WG1 Meeting #103e, e-Meeting, Oct. 26-Nov. 13, 2020, 14 pages.
Extended European Search Report dated Sep. 3, 2024, for the corresponding European Patent Application No. 21935142.6, 10 pages.
Lenovo et al., "Enhancements for DM-RS bundling for multiple PUSCH," R1-2101003, Agenda Item: 8.8.1.3, 3GPP TSG RAN WG1 #104-e, e-meeting, Jan. 25-Feb. 5, 2021, 4 pages.
Moderator (China Telecom), "FL summary of PUSCH coverage enhancements, " RI-2009320, Agenda Item: 8.8.2.1, 3GPP TSG RAN WG1 Meeting #103-e, E-meeting, Oct. 26-Nov. 13, 2020, 38 pages.
Oppo, "Consideration on PUSCH coverage enhancement," RI-2008271, Agenda Item: 8.8.2.1, 3GPP TSG RAN WG1 #103-e, e-Meeting, Oct. 26-Nov. 13, 2020, 9 pages.
Oppo, "Joint channel estimation for PUSCH," R1-2101778, Agenda Item: 8.8.1.3, 3GPP TSG RAN WG1 #104-e, e-Meeting, Jan. 25-Feb. 5, 2021, 7 pages.
Panasonic, "Discussion on joint channel estimation for PUSCH," R1-2101020, Agenda Item: 8.8.1.3, 3GPP TSG RAN WG1 #104-e, e-Meeting, Jan. 25-Feb. 5, 2021, 3 pages.

* cited by examiner

100

200

```
-- ASN1START
-- TAG-PUSCH-TIMEDOMAINRESOURCEALLOCATIONLIST-START

PUSCH-TimeDomainResourceAllocationList ::=  SEQUENCE (SIZE(1..maxNrofUL-Allocations)) OF PUSCH-TimeDomainResourceAllocation PUSCH-TimeDomainResourceAllocation ::=  SEQUENCE {
    k2                          INTEGER(0..32)                                    OPTIONAL,    -- Need S
    mappingType                 ENUMERATED (typeA, typeB),
    startSymbolAndLength        INTEGER (0..127)
}

PUSCH-TimeDomainResourceAllocationList-r16 ::=  SEQUENCE (SIZE(1..maxNrofUL-Allocations-r16)) OF PUSCH-TimeDomainResourceAllocation-r16

PUSCH-TimeDomainResourceAllocation-r16 ::=  SEQUENCE {
    k2-r16                      INTEGER(0..32)              OPTIONAL,    -- Need S
    puschAllocationList-r16     SEQUENCE (SIZE(1..maxNrofMultiplePUSCHs-r16)) OF PUSCH-Allocation-r16,
    ...
}

PUSCH-Allocation-r16 ::=  SEQUENCE {
    mappingType-r16             ENUMERATED (typeA, typeB)                         OPTIONAL,    -- Cond NotFormat01-02-Or-TypeA
    startSymbolAndLength-r16    INTEGER (0..127)                                  OPTIONAL,    -- Cond NotFormat01-02-Or-TypeA
    startSymbol-r16             INTEGER (0..13)                                   OPTIONAL,    -- Cond RepTypeB
    length-r16                  INTEGER (1..14)                                   OPTIONAL,    -- Cond RepTypeB
    numberOfRepetitions-r16     ENUMERATED (n1, n2, n3, n4, n7, n8, n12, n16) OPTIONAL,    -- Cond Format01-02
    dmrs-AdditionalPositionPattern
    ...
}

-- TAG-PUSCH-TIMEDOMAINRESOURCEALLOCATIONLIST-STOP
-- ASN1STOP
```

FIG. 9

```
PUSCH-Allocation-r16 ::=  SEQUENCE {
   mappingType-r16               ENUMERATED {typeA, typeB}          OPTIONAL,   -- Cond NotFormat01-02-Or-TypeA
   startSymbolAndLength-r16       INTEGER (0..127)                  OPTIONAL,   -- Cond NotFormat01-02-Or-TypeA
   startSymbol-r16               INTEGER (0..13)                    OPTIONAL,   -- Cond RepTypeB
   length-r16                    INTEGER (1..14)                    OPTIONAL,   -- Cond RepTypeB
   numberOfRepetitions-r16        ENUMERATED {n1, n2, n3, n4, n7, n8, n12, n16}  OPTIONAL,   -- Cond Format01-02
   dmrs-AdditionalPositionPattern  ENUMERATED {pattern1, pattern2, pattern3, pattern4}
   ...
```

FIG. 10

|  | 1st repetition | 2nd repetition | 3rd repetition |  |
|---|---|---|---|---|
| pattern1 | dmrs-AdditionalPosition indicated in DMRS-UplinkConfig | pos0 | dmrs-AdditionalPosition indicated in DMRS-UplinkConfig |  |
| pattern2 | dmrs-AdditionalPosition indicated in DMRS-UplinkConfig | pos1 | dmrs-AdditionalPosition indicated in DMRS-UplinkConfig |  |
| pattern3 | dmrs-AdditionalPosition indicated in DMRS-UplinkConfig | pos2 | dmrs-AdditionalPosition indicated in DMRS-UplinkConfig |  |
| pattern4 | dmrs-AdditionalPosition indicated in DMRS-UplinkConfig | pos3 | dmrs-AdditionalPosition indicated in DMRS-UplinkConfig |  |
|  |  |  |  | ... |

FIG. 11

```
PUSCH-Allocation-r16 ::= SEQUENCE {
    mappingType-r16               ENUMERATED {typeA, typeB}
    startSymbolAndLength-r16      INTEGER (0..127),                              OPTIONAL,  --- Cond NotFormat01-02-Or-TypeA
    startSymbol-r16               INTEGER (0..13)                                OPTIONAL,  -- Cond NotFormat01-02-Or-TypeA
    length-r16                    INTEGER (1..14)                                OPTIONAL,  -- Cond RepTypeB
    numberOfRepetitions-r16       ENUMERATED {n1, n2, n3, n4, n7, n8, n12, n16}  OPTIONAL,  -- Cond RepTypeB
    dmrs-AdditionalPositionPattern SEQUENCE (SIZE (1..numerOfRepetitions-r16)) OF dmrs-AdditionalPosition  OPTIONAL,  -- Cond Format01-02
    ...
}
```

FIG. 12

```
PUSCH-Allocation-r16 ::= SEQUENCE {
  mappingType-r16                      ENUMERATED {typeA, typeB}                          OPTIONAL,   -- Cond NotFormat01-02-Or-TypeA
  startSymbolAndLength-r16             INTEGER (0..127)                                   OPTIONAL,   -- Cond NotFormat01-02-Or-TypeA
  startSymbol-r16                      INTEGER (0..13)                                    OPTIONAL,   -- Cond RepTypeB
  length-r16                           INTEGER (1..14)                                    OPTIONAL,   -- Cond RepTypeB
  numberOfRepetitions-r16              ENUMERATED {n1, n2, n3, n4, n7, n8, n12, n16}      OPTIONAL,   -- Cond Format01-02
  dmrs-AdditionalPositionPatternTypeA  ENUMERATED {pattern1, pattern2, pattern3, pattern4}
  dmrs-AdditionalPositionPatternTypeB  ENUMERATED {pattern1, pattern2, pattern3, pattern4}
  ...
}
```

FIG. 14

```
PUSCH-Allocation-r16 ::= SEQUENCE {
    mappingType-r16                     ENUMERATED {typeA, typeB}
    startSymbolAndLength-r16            INTEGER (0..127)                                OPTIONAL,   -- Cond NotFormat01-02-Or-TypeA
    startSymbol-r16                     INTEGER (0..13)                                 OPTIONAL,   -- Cond NotFormat01-02-Or-TypeA
    length-r16                          INTEGER (1..14)                                 OPTIONAL,   -- Cond RepTypeB
    numberOfRepetitions-r16             ENUMERATED {n1, n2, n3, n4, n7, n8, n12, n16}   OPTIONAL,   -- Cond RepTypeB
    dmrs-AdditionalPositionPatternTypeA SEQUENCE (SIZE(1..numberOfRepetitions-r16) OF dmrs-AdditionalPosition           OPTIONAL,   -- Cond Format01-02
    dmrs-AdditionalPositionPatternTypeB SEQUENCE (SIZE(1..numberOfRepetitions-r16) OF dmrs-AdditionalPosition
    ...
}
```

FIG. 15

```
PUSCH-Allocation-r16 ::= SEQUENCE {
    mappingType-r16                  ENUMERATED {typeA, typeB}
    startSymbolAndLength-r16         INTEGER (0..127)                        OPTIONAL,    -- Cond NotFormat01-02-Or-TypeA
    startSymbol-r16                  INTEGER (0..13)                         OPTIONAL,    -- Cond NotFormat01-02-Or-TypeA
    length-r16                       INTEGER (1..14)                         OPTIONAL,    -- Cond RepTypeB
    numberOfRepetitions-r16          ENUMERATED {n1, n2, n3, n4, n7, n8, n12, n16}   OPTIONAL,    -- Cond RepTypeB
    dmrs-AdditionalPositionPattern                                          OPTIONAL,    -- Cond Format01-02
        SEQUENCE (SIZE (1..numberOfRepetitions-r16)) OF DMRS-UplinkConfig
    ...
}
```

FIG. 16

```
-- ASN1START
-- TAG-DMRS-UPLINKCONFIG-START

DMRS-UplinkConfig ::=            SEQUENCE {
    dmrs-Type                       ENUMERATED {type2}                          OPTIONAL,   -- Need S
    dmrs-AdditionalPosition         ENUMERATED {pos0, pos1, pos3}               OPTIONAL,   -- Need S
    dmrs-AdditionalPositionPattern  ::=  SEQUENCE (SIZE {1..maxNrofRepetition}) OF dmrs-AdditionalPosition
    phaseTrackingRS                 SetupRelease { PTRS-UplinkConfig }          OPTIONAL,   -- Need M
    maxLength                       ENUMERATED {len2}                           OPTIONAL,   -- Need S
    transformPrecodingDisabled      SEQUENCE {
        scramblingID0                   INTEGER (0..65535)                      OPTIONAL,   -- Need S
        scramblingID1                   INTEGER (0..65535)                      OPTIONAL,   -- Need S
        ...,
        [[
    dmrs-Uplink-r16                 ENUMERATED {enabled}                        OPTIONAL,   -- Need R
        ]]
    }
    transformPrecodingEnabled       SEQUENCE {
        nPUSCH-Identity                 INTEGER(0..1007)                        OPTIONAL,   -- Need S
        sequenceGroupHopping            ENUMERATED {disabled}                   OPTIONAL,   -- Need S
        sequenceHopping                 ENUMERATED {enabled}                    OPTIONAL,   -- Need S
        ...,
        [[
    dmrs-UplinkTransformPrecoding-r16   SetupRelease {DMRS-UplinkTransformPrecoding-r16}   OPTIONAL,   -- Need M
        ]]
    }
    ...
}

DMRS-UplinkTransformPrecoding-r16  ::= SEQUENCE {
    pi2BPSK-ScramblingID0               INTEGER(0..65535)                       OPTIONAL,   -- Need S
    pi2BPSK-scramblingID1               INTEGER(0..65535)                       OPTIONAL,   -- Need S
}

-- TAG-DMRS-UPLINKCONFIG-STOP
-- ASN1STOP
```

FIG. 18

```
DMRS-UplinkConfig ::=          SEQUENCE {
    dmrs-Type                  ENUMERATED {type2}                                OPTIONAL,     -- Need S
    dmrs-AdditionalPosition    ENUMERATED {pos0, pos1, pos3}                     OPTIONAL,     -- Need S
    dmrs-AdditionalPositionPatternList ::= SEQUENCE (SIZE (1..maxNrofPatterns}) OF dmrs-AdditionalPositionPattern
    dmrs-AdditionalPositionPattern ::=  SEQUENCE (SIZE (1..maxNrofRepetition)) OF dmrs-AdditionalPosition
    ...
```

FIG. 19

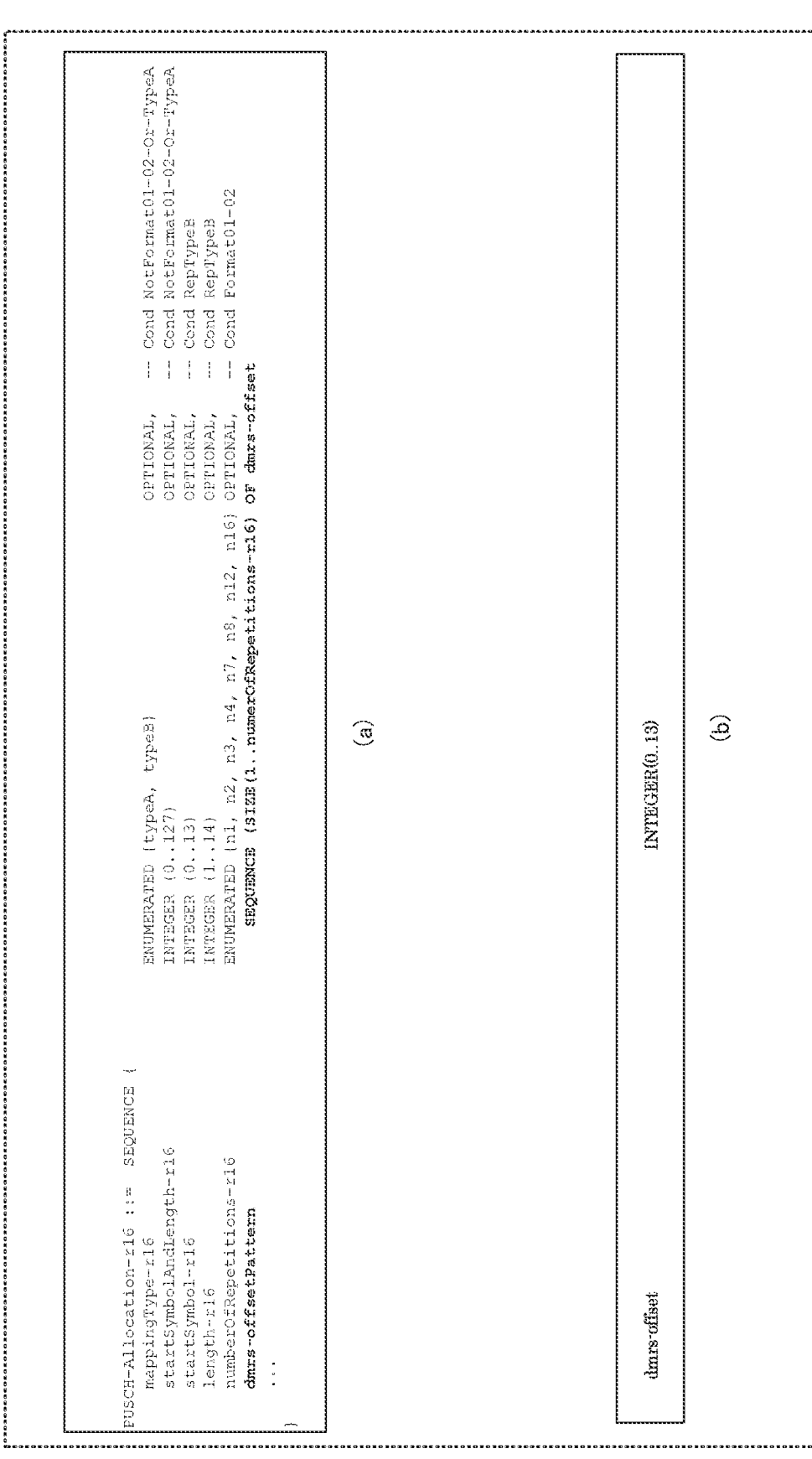

```
PUSCH-Allocation-r16 ::= SEQUENCE {
    mappingType-r16            ENUMERATED {typeA, typeB}        OPTIONAL,    -- Cond NotFormat01-02-Or-TypeA
    startSymbolAndLength-r16   INTEGER (0..127)                 OPTIONAL,    -- Cond NotFormat01-02-Or-TypeA
    startSymbol-r16            INTEGER (0..13)                  OPTIONAL,    -- Cond RepTypeB
    length-r16                 INTEGER (1..14)                  OPTIONAL,    -- Cond RepTypeB
    numberOfRepetitions-r16    ENUMERATED {n1, n2, n3, n4, n7, n8, n12, n16}   OPTIONAL,    -- Cond Format01-02
    dmrs-offsetPattern         SEQUENCE (SIZE (1..numerOfRepetitions-r16) OF dmrs-offset
    ...
}
```

(a)

```
dmrs-offset    INTEGER(0..13)
```

COMMUNICATION DEVICE AND COMMUNICATION METHOD

TECHNICAL FIELD

The present disclosure relates to a communication apparatus and a communication method.

BACKGROUND ART

In recent years, a dramatic growth of Internet of Things (IoT) has been expected with the expansion and diversification of radio services as a background. The usage of mobile communication is extending to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. The 5th generation mobile communication systems (5G) has features of enhanced mobile broadband (eMBB), massive machine type communication (mMTC), and ultra reliable and low latency communication (URLLC), and can flexibly provide radio communication in response to a wide variety of needs, by using these features.

The 3rd Generation Partnership Project (3GPP) as an international standardizing body has been specifying New Radio (NR) as one of 5G radio interfaces.

CITATION LIST

Non-Patent Literature

NPL 1
3GPP TS38.104V15.12.0, "NR; Base Station (BS) radio transmission and reception (Release 15)," December 2020.
NPL 2
3GPP TSG RAN Meeting #90e, RP-202928, "New WID on NR coverage enhancements." China Telecom, December 2020.
NPL 3
3GPP TS38.211 V16.4.0. "NR; Physical channels and modulation (Release 16)," December 2020.
NPL 4
3GPP TS38.212 V16.4.0, "NR; Multiplexing and channel coding (Release 16)," December 2020.
NPL 5
3GPP TS38.213 V16.4.0, "NR; Physical layer procedures for control (Release 16)," December 2020.
NPL 6
3GPP TS38.214 V16.4.0, "NR; Physical layer procedures for data (Release 16)," December 2020.
NPL 7
3GPP TS38.331 V16.3.1, "NR: Radio Resource Control (RRC) protocol specification (Release 16)", January 2021.

SUMMARY OF INVENTION

Technical Problem

However, there is scope for further study on a method of configuring a reference signal flexibly.

One non-limiting and exemplary embodiment of the present disclosure facilitates providing a communication apparatus and a communication method each capable of configuring a reference signal flexibly.

A communication apparatus according to an exemplary embodiment of the present disclosure includes: control circuitry, which, in operation, makes a configuration of a reference signal to be assigned to a first section for a repetition transmission and a configuration of a reference signal to be assigned to a second section for the repetition transmission different from each other; and transmission circuitry, which, in operation, performs the repetition transmission based on the configurations of the reference signals.

It should be noted that general or specific embodiments may be implemented as a system, a method, an integrated circuit, a computer program, a storage medium, or any selective combination thereof.

According to an exemplary embodiment of the present disclosure, it is possible to configure a reference signal flexibly.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 9 illustrates an exemplary Physical Uplink Shared Channel (PUSCH)-TimeDomainResourceAllocation Information Element (IE) according to Embodiment 1;

FIG. 10 illustrates an example of PUSCH-Allocation according to Embodiment 1:

FIG. 11 illustrates exemplary DMRS configuration patterns according to Embodiment 1:

FIG. 12 illustrates another example of the PUSCH-Allocation according to Embodiment 1;

FIG. 14 illustrates an example of PUSCH-Allocation according to Variation 1;

FIG. 15 illustrates another example of the PUSCH-Allocation according to Variation 1;

FIG. 16 illustrates an example of PUSCH-Allocation according to Variation 2:

FIG. 18 illustrates an exemplary DMRS-UplinkConfig IE according to Embodiment 1:

FIG. 19 illustrates an exemplary DMRS-UplinkConfig IE according to Variation 5;

FIG. 20 illustrates an example of PUSCH-Allocation according to Embodiment 3;

DESCRIPTION OF EMBODIMENTS

Figure 1:
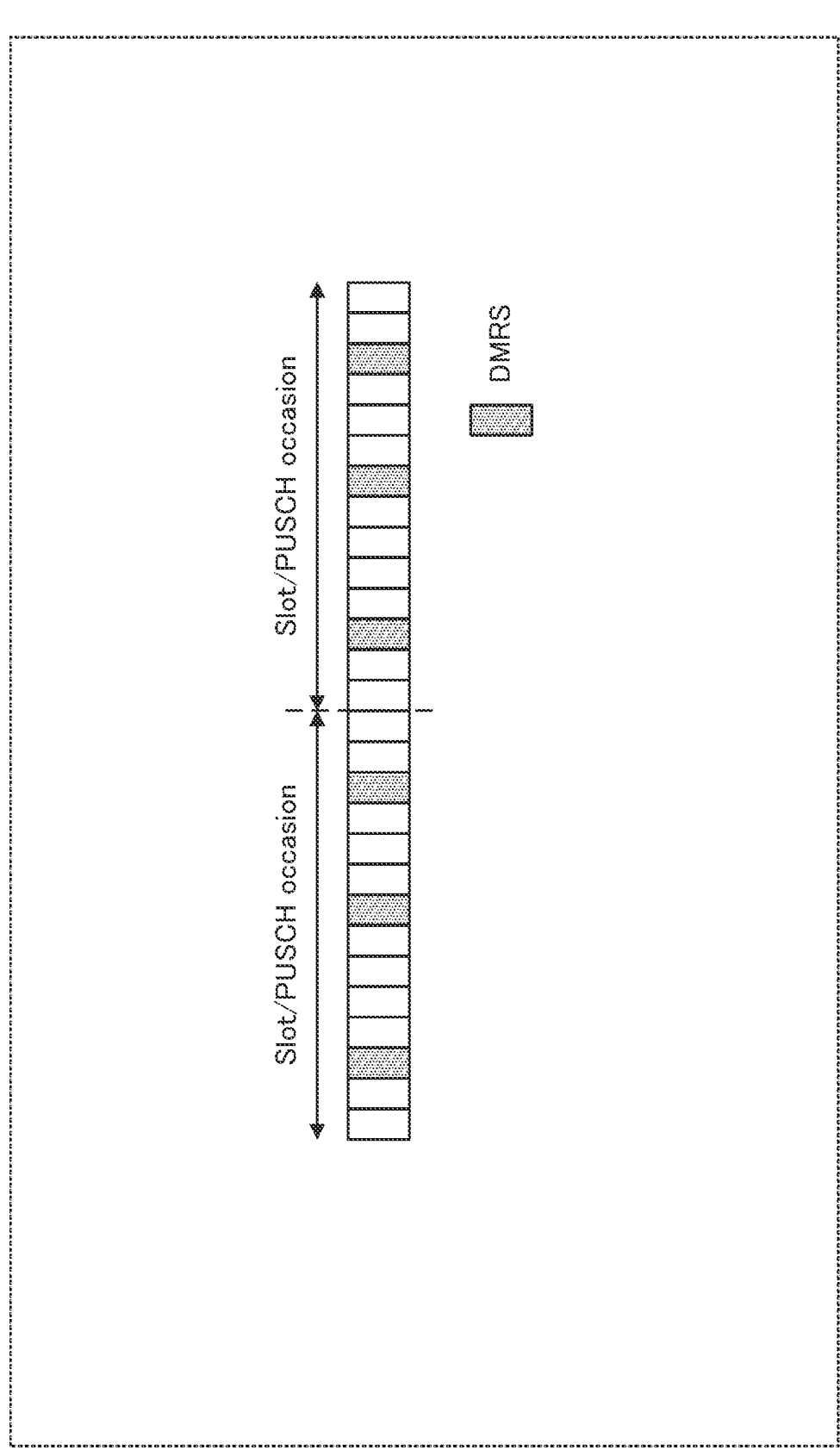
FIG. 1 illustrates an exemplary Demodulation Reference Signal (DMRS) configuration in repetition of an uplink signal.

Hereinafter, embodiments of the present disclosure will be described in detail with reference to the accompanying drawings.

In NR, for example, in addition to a frequency band of 6 GHz or less, mainly within 700 MHz to 3.5 GHz band (e.g., may be referred to as Frequency Range 1 (FR1)), which is used for cellular communication, a millimeter-wave band such as 28 GHz or 39 GHz band capable of ensuring a wide band (e.g., may be referred to as FR2) can be utilized (e.g., see Non-Patent Literature (hereinafter referred to as "NPL") 1). Further, for example, in FR1, a high frequency band is possibly used compared with the frequency band used in Long Term Evolution (LTE) or 3rd Generation mobile communication systems (3G) such as 3.5 GHz band. The higher the frequency band is, the greater a radio wave propagation loss is likely to be, and thus, the received quality of radio waves is susceptible to deterioration. Hence, in NR, for example, it is expected to ensure almost the same communication area (or coverage) as in the Radio Access Technology (RAT) such LTE or 3G, in other words, to ensure an appropriate communication quality when the high frequency band is used compared with LTE or 3G. In one example, in Release 17 (e.g., referred to as "Rel. 17"), a method of improving the coverage in NR has been studied (e.g., see NPL 2).

In NR, for example, a terminal (also referred to as, e.g., User Equipment (UE)) transmits and receives data in accordance with resource allocation indicated by at least one of a layer-1 control signal (e.g., Downlink Control Information (DCI)) on a downlink control channel (e.g., Physical Downlink Control Channel (PDCCH)) from a base station (also referred to as, e.g., gNB) and Radio Resource Control (RRC) corresponding to layer 3 (e.g., see NPLs 3 to 6).

In uplink, for example, the terminal transmits an uplink data channel (e.g., Physical Uplink Shared Channel (PUSCH)) in accordance with the resource allocation (e.g., Grant or UL grant) from the base station. Information on the resource allocation included in at least one of the DCI and the RRC may include, for example, information on a time-domain resource with which PUSCH is transmitted. For example, the information on the time-domain resource may include information (e.g., K2) on the timing (e.g., slot offset) from the slot in which the terminal has received PDCCH to the slot in which the terminal transmits PUSCH, the start-symbol position of PUSCH in the slot, or information on the number of symbols for transmitting PUSCH.

In an uplink transmission in NR, for example, the terminal can transmit PUSCH using a plurality of slots (this transmission is also referred to as Repetition). In a case where the Repetition is applied, the information on the time-domain resource for transmitting PUSCH may include information on the number of Repetitions.

In NR Rel. 15/16, two PUSCH repetition schemes are specified, for example (e.g., see NPL 6).

The first Repetition scheme is a slot-by-slot Repetition in which the same time resource allocation is applied over multiple slots. In the following, this Repetition scheme is referred to as "PUSCH repetition Type A."

The second Repetition scheme is a scheme in which one or a plurality of PUSCHs is repeatedly transmitted in one slot. In the following, this Repetition scheme is referred to as "PUSCH repetition Type B." In PUSCH repetition Type B, for example, a time-domain resource for a first (e.g., initial) PUSCH transmission (e.g., also referred to as Repetition or PUSCH occasion) and the number of repetitions may be indicated to a terminal. To time-domain resources for the second and subsequent PUSCH transmissions, for example, symbols may be assigned, which are consecutive to and in number identical to the previous PUSCH transmission.

Hereinafter, for convenience, the term "slot/Repetition" may represent any of the slots and Repetitions (or PUSCH occasions) that are sections (time intervals) for repetition transmission of PUSCH in each Repetition scheme.

As a functional extension of PUSCH repetition Type A, NR Rel. 17 includes a method of counting the number of slots for repetition (hereinafter referred to as repetition slots) based on an uplink slot available for the PUSCH transmission, for example (e.g., see NPL 2).

Further, in NR, for example, in a resource for PUSCH (hereinafter also referred to as "PUSCH resource"), a reference signal used in channel estimation for demodulation (e.g., Demodulation Reference Signal (DMRS)) is placed. A DMRS may be placed (e.g., front loaded) at the front of a slot, for example. Further, DMRSs (e.g., including additional DMRS) may be arranged in a plurality of symbols in a slot (see, e.g., NPLs 3 and 6).

In NR Rel. 15/16, for example, when the PUSCH repetition is applied, DMRS configurations in the respective slots or Repetitions (or PUSCH occasions) are identical to each other. Herein, the DMRS configuration may include, for example, parameters such as the number of DMRS symbols, the DMRS position, and the DMRS type in each slot/Repetition.

For example, in a communication environment such that coverage enhancement can be performed, e.g., a communication environment with a lower Signal-to-Noise power Ratio (SNR) or Signal-to-Interference plus Noise power Ratio (SINR), channel estimation accuracy is likely to deteriorate.

In order to improve the coverage, for example, the introduction of Repetition is expected. In NR (e.g., NR Rel. 15/16), there is a constraint (or limitation) that a channel estimation result demodulated (or estimated) by DMRS is available in the slot including the DMRS (i.e., not available in a slot different from slot including the DMRS).

Meanwhile, in NR Rel. 17, as a technique for improving the channel estimation accuracy, a method of combining DMRSs in multiple slots/Repetitions has been studied, for example (e.g., see NPL 6). The method of combining the DMRSs in the multiple slots/Repetitions is also referred to as, for example, inter-slot channel estimation, joint channel estimation, or DMRS bundling. The introduction of the method of combining the DMRSs in the multiple slots/ Repetitions makes it possible to, for example, eliminate the aforementioned limitation on use of the channel estimation result demodulated by DMRS, thereby improving the received SNR of DMRS used in the channel estimation.

Here, in the Repetition, the same DMRS configuration in each of the plurality of slots/Repetitions is not appropriate for the channel estimation in some cases.

FIG. 1 illustrates an exemplary DMRS configuration where the number of repetition transmissions is twice and the time-resource allocation in each slot/Repetition is 14 symbols, as an example. The DMRS configuration illustrated in FIG. 1 may be, for example, a DMRS configuration based on the specification in NR Rel. 15/16.

Figure 2:
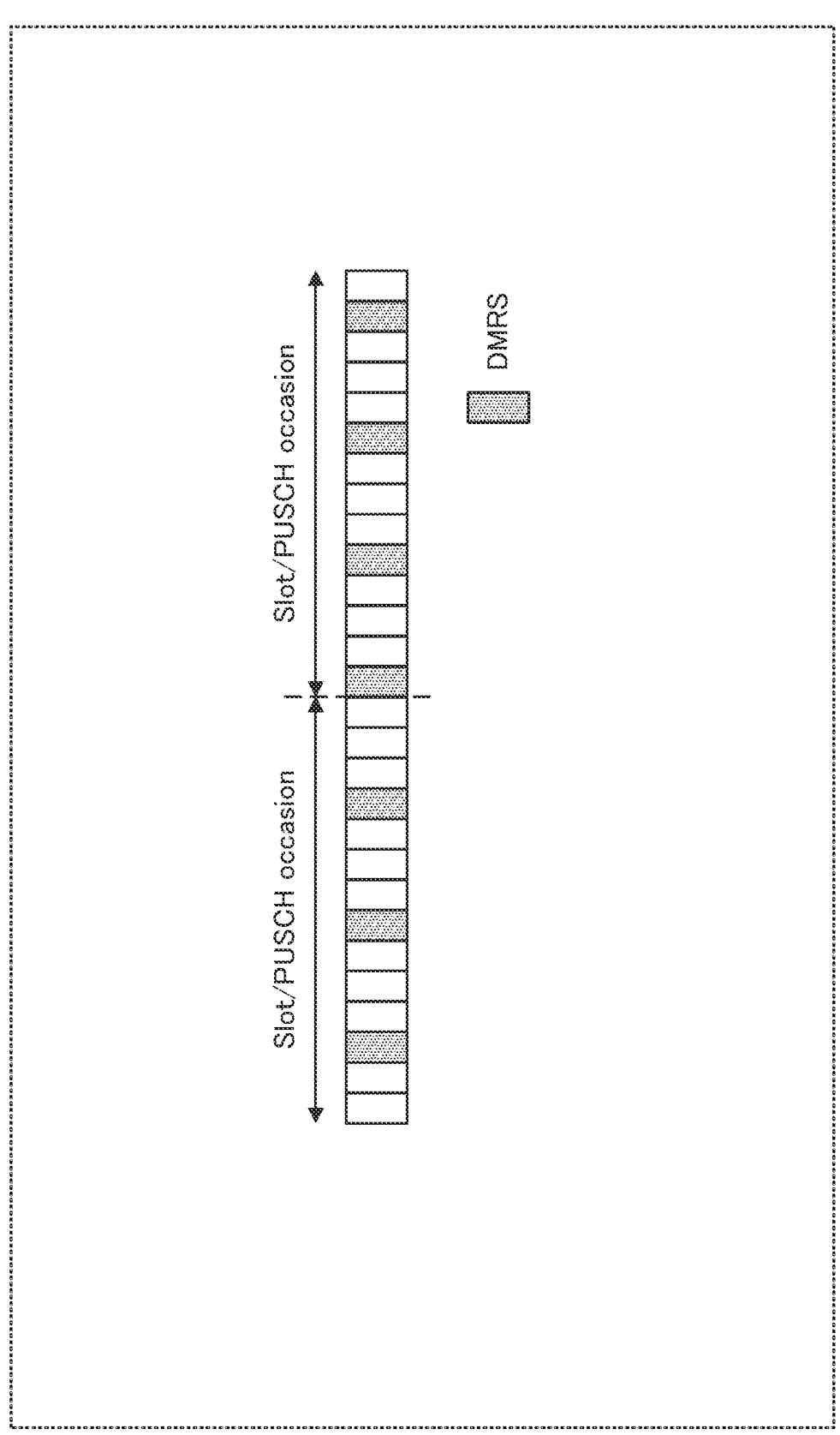
FIG. 2 illustrates another exemplary DMRS configuration in the repetition of the uplink signal.

In FIG. 1, for example, spacing between DMRSs arranged over two slots/Repetitions can be unequal. For example, in a fading environment where a channel fluctuates in time, as illustrated in FIG. 2, followability to the channel fluctuation can be improved by an arrangement of DMRSs at equal spacing in the sections of the multiple slots/Repetitions to which the joint channel estimation is applied rather than by the arrangement with unequal spacing, thus improving the transmission performance of the PUSCH repetition.

Figure 3:
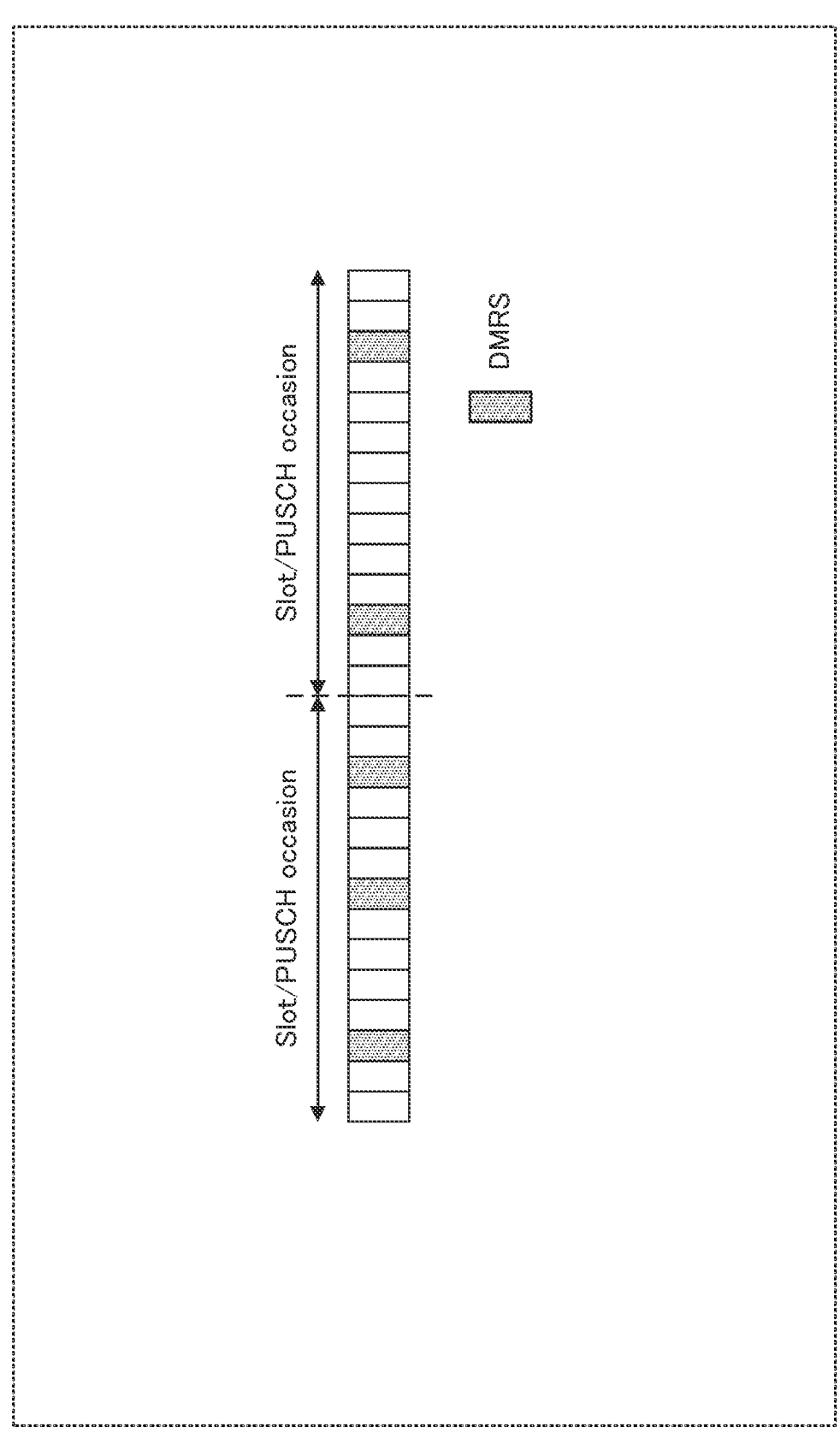
FIG. 3 illustrates still another exemplary DMRS configuration in the repetition of the uplink signal.

Further, in FIG. 1 (e.g., example of NR Rel. 15/16), for example, even when a temporal fluctuation of a channel is relatively small, the number of DMRS symbols specific to a slot/Repetition cannot be changed due to the limitation on the DMRS configuration; as a result, overhead of DMRS may increase, and the transmission efficiency may be thus reduced. On the other hand, for example, as illustrated in FIG. 3, w % ben the number of DMRS symbols is reduced for some of the multiple slots/Repetitions to which the joint channel estimation is applied (second slot/Repetition in FIG. 3), a resource to which data is mappable in this slot/ Repetition increases, so that the transmission performance or transmission efficiency of the PUSCH repetition can be improved with a coding gain.

As described above, there is scope for further study on a method of appropriately configuring a DMRS arrangement or the number of DMRS symbols in sections of multiple slots/Repetitions to which the joint channel estimation is applied.

The method of appropriately configuring the DMRS arrangement or the number of DMRS symbols may vary depending on, for example, a setting such as the number of slots/Repetitions to which the joint channel estimation is applied or the time-resource allocation for each slot/Repetition. Therefore, for each slot/Repetition to which the joint channel estimation is applied, it is expected to search for (e.g., optimize) a DMRS arrangement or the number of DMRS symbols having better transmission performance (e.g., Block Error Ratio (BLER) performance or transmission efficiency).

Herein, the number of combinations of the numbers of slots/Repetitions to which the joint channel estimation is applied and the time-resource allocation for each slot/Repetition is enormous, and thus, determining an appropriate (e.g., optimal) DMRS arrangement or number of DMRS symbols for each combination by search has a large impact on specification.

For example, in NR Rel. 15/16, four types of combinations (e.g., pos 0, pos 1, pos 2, and pos 3) of the DMRS arrangements and the numbers of DMRS symbols are specified for 2 to 14 symbols of the time-resource allocation for each slot/Repetition (see, e.g., NPL 3). Adding a new combination of the DMRS arrangement and the number of DMRS symbols in order to apply the joint channel estimation possibly complicates the hardware and software processing of DMRS generation in a transmitter. Moreover, in a receiver, while applying the joint channel estimation itself is an additional requirement, the hardware and software processing of channel estimation is possibly complicated on a reception side due to implementation of channel estimation for a new combination of the DMRS arrangement and the number of DMRS symbols in order to apply the joint channel estimation.

In a non-limiting and exemplary embodiment of the present disclosure, a description will be given of a method of improving the flexibility of a DMRS configuration (e.g., configurations of DMRS arrangement and the number of DMRS symbols) and suppressing an increase in signaling overhead or the complexity of hardware/software processing in a transmitter and a receiver.

For example, in anon-limiting and exemplary embodiment of the present disclosure, in transmission and reception of a signal to which Repetition is applied, the already specified DMRS configurations (e.g., by NR Rel. 15/16) are used for DMRS configurations in the respective slots/Repetitions, and the DMRS configurations (e.g., DMRS arrangements or the numbers of DMRS symbols) in the respective slots/Repetitions are varied. This allows DMRS configurations suitable for channel estimation to be individually configured for the slots/Repetitions.

As described above, for example, in NR Rel. 15/16, four types of combinations (e.g., pos 0, pos 1, pos 2, and pos 3) of the DMRS arrangements and the numbers of DMRS symbols are specified for 2 to 14 symbols of the time-resource allocation for each slot/Repetition. Here, the DMRS arrangement and the number of DMRS symbols suitable for the channel estimation may vary depending on a channel state (e.g., SNR, SINR, or channel fluctuation). Therefore, even when the predetermined DMRS configuration is applied to each slot/Repetition, it is difficult to improve the channel estimation accuracy. Accordingly, it is expected that the DMRS configuration for each slot/Repetition will be configured dynamically in accordance with the channel state.

In addition, an indication (e.g., indication by DCI) may be made to share a dynamic DMRS configuration between transmission and reception sides. The DCI overhead herein may increase, for example, when the number of slots/ Repetitions to which the joint channel estimation is applied is N, up to $4^N$ patterns of indications are made in order to configure, for each of the slots/Repetitions, patterns of the four types of combinations (e.g., pos 0, pos 1, pos 2, and pos 3) of the DMRS arrangements and the numbers of DMRS symbols.

In a non-limiting and exemplary embodiment of the present disclosure, information (or parameter) for determining a combination of DMRS configurations (e.g., also referred to as a DMRS configuration pattern) for each of a plurality of slots/Repetition to which the joint channel estimation is applied may be configured in advance for a terminal by a higher layer signalling (e.g., Radio Resource Control (RRC)). The information for determining the DMRS configuration pattern may include, for example, information on a plurality of candidates for the DMRS configuration pattern for each of the plurality of slots/Repetitions.

Additionally, in anon-limiting and exemplary embodiment of the present disclosure, the terminal may determine a DMRS configuration pattern for each of slots/Repetitions actually used for transmission and reception, based on resource-allocation information included in the DCI or the RRC and the information for determining the DMRS configuration pattern for each slot/Repetition described above. By way of example, the resource-allocation information may include information indicating any one of the plurality of candidates for the DMRS configuration pattern for each of the plurality of slots/Repetitions.

According to a non-limiting example of the present disclosure, for example, it is possible to suppress an increase in DCI overhead and to individually configure a DMRS configuration (e.g., DMRS arrangement or the number of DMRS symbols) for each slot/Repetition, thereby improving the flexibility of the DMRS configuration.

Embodiment 1

[Overview of Communication System]

A communication system according to each embodiment of the present disclosure includes base station 100 and terminal 200.

Figure 4:
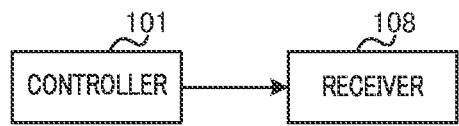
FIG. 4 is a block diagram illustrating an exemplary configuration of part of a base station.

FIG. 4 is a block diagram illustrating an exemplary configuration of part of base station 100 (e.g., corresponding to communication apparatus) according to an embodiment of the present disclosure. In base station 100 illustrated in FIG. 4, controller 101 (e.g., corresponding to control circuitry) makes a configuration of a reference signal (e.g., DMRS) to be assigned to a first section (e.g., slot/Repetition) in which reception of a repetition transmission is performed and a configuration of a reference signal to be assigned to a second section in which reception of the repetition transmission is performed different from each other. Receiver 108 (e.g., corresponding to reception circuitry) performs the reception of the repetition transmission based on the configurations of the reference signals.

Figure 5:
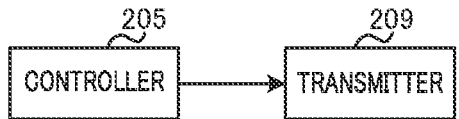
FIG. 5 is a block diagram illustrating an exemplary configuration of part of a terminal.

FIG. 5 is a block diagram illustrating an exemplary configuration of part of terminal 200 (e.g., corresponding to communication apparatus) according to an embodiment of the present disclosure. In terminal 200 illustrated in FIG. 5, controller 205 (e.g., corresponding to control circuitry) makes a configuration of a reference signal (e.g., DMRS) to be assigned to a first section (e.g., slot/Repetition) for a repetition transmission and a configuration of a reference signal to be assigned to a second section for the repetition transmission different from each other. Transmitter 209 (e.g., corresponding to transmission circuitry) performs the repetition transmission based on the configurations of the reference signals.

[Configuration of Base Station]

Figure 6:
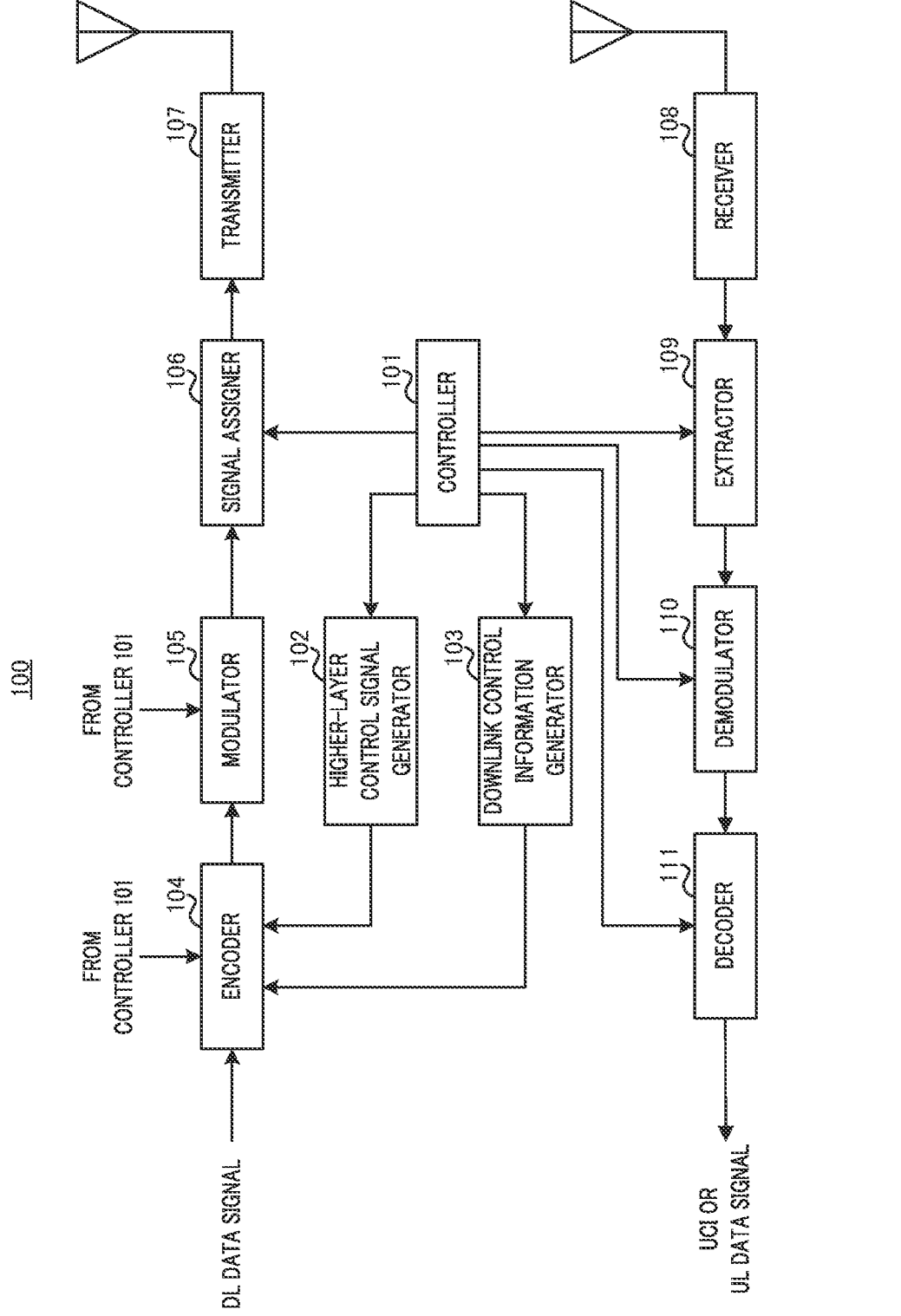
FIG. 6 is a block diagram illustrating an exemplary configuration of the base station.

FIG. 6 is a block diagram illustrating an exemplary configuration of base station 100 according to Embodiment 1. In FIG. 6, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101 determines (or identifies), based on, for example, the methods described below, information on a DMRS configuration (e.g., DMRS configuration pattern) for each of a plurality of slots/Repetitions. Controller 101 outputs the determined information on the DMRS configuration pattern to extractor 109, demodulator 110, and decoder 111, for example. Controller 101 may output the determined information on the DMRS configuration pattern to at least one of higher-layer control signal generator 102 and downlink control information generator 103.

Controller 101 also determines, for example, information on reception of a downlink data signal (e.g., PDSCH) for terminal 200, information on transmission of an uplink data signal (e.g., PUSCH), and information on transmission of an uplink control signal (e.g., PUCCH), and outputs the determined information to higher-layer control signal generator 102. The information on the reception of the downlink data signal and the information on the transmission of the uplink data signal may include, for example, information on time-domain resource allocation (e.g., Time Domain Resource Allocation (TDRA)) (e.g., information on TDRA table) or information on Repetition (e.g., information on the number of Repetitions). Meanwhile, the information on the transmission of the uplink control signal may include, for example, information on a PUCCH resource set. Further, for example, at least one of the information on the reception of the downlink data signal, the information on the transmission of the uplink data signal, and the information on the transmission of the uplink control signal may include the information on the DMRS configuration pattern described above.

Moreover, controller 101 determines, for example, information (e.g., coding and modulation scheme (MCS) and radio resource allocation) on a downlink signal for transmitting a downlink data signal, a higher-layer control signal or downlink control information, and outputs the determined information to encoder 104, modulator 105, and signal assigner 106. Controller 101 also outputs, for example, the information on the downlink signal (e.g., downlink data signal and higher-layer control signal) to downlink control information generator 103. Besides, for example, the information on the downlink signal may include the information on the DMRS configuration pattern described above.

Further, controller 101 determines information (e.g., MCS and radio resource allocation) on transmission of an uplink data signal (e.g., PUSCH) in terminal 200, for example. Controller 101 outputs the determined information on the uplink data signal to downlink control information generator 103, extractor 109, and decoder 111, for example. Besides, for example, the information on the uplink data signal may include the information on the DMRS configuration pattern described above.

Furthermore, controller 101 determines information (e.g., PUCCH resource) on transmission of an uplink control signal (e.g., PUCCH) in terminal 200, for example. Controller 101, for example, outputs the determined information on the uplink control signal to higher-layer control signal generator 102 and downlink control information generator 103. Controller 101 also outputs the determined information on the uplink control signal to extractor 109, demodulator 110, and decoder 111. Besides, for example, the information on the uplink control signal may include the information on the DMRS configuration pattern described above.

Higher-layer control signal generator 102, for example, generates a higher-layer control signal bit sequence based on the information inputted from controller 101 and outputs the higher-layer control signal bit sequence to encoder 104.

Downlink control information generator 103, for example, generates a downlink control information (e.g., DCI) bit sequence based on the information inputted from controller 101 and outputs the generated DCI bit sequence to encoder 104. Note that the control information may be transmitted to a plurality of terminals.

Encoder 104, for example, encodes downlink data (e.g., DL data signal), the bit sequence inputted from higher-layer control signal generator 102, or the DCI bit sequence inputted from downlink control information generator 103, based on the information inputted from controller 101. Encoder 104 outputs the encoded bit sequence to modulator 105.

Modulator 105, for example, modulates the encoded bit sequence inputted from encoder 104, based on the information inputted from controller 101, and outputs the modulated signal (e.g., symbol sequence) to signal assigner 106.

Signal assigner 106 maps, to a radio resource, the symbol sequence (including, e.g., downlink data signal or control signal) inputted from modulator 105, based on the information indicating the radio resource inputted from controller 101, for example. Signal assigner 106 outputs, to transmitter 107, a downlink signal to which the signal is mapped.

Transmitter 107, for example, performs transmission-waveform generation processing such as orthogonal Frequency Division Multiplexing (OFDM) on the signal inputted from signal assigner 106. In addition, for example, in the case of an OFDM transmission in which a cyclic prefix (CP) is added, transmitter 107 performs Inverse Fast Fourier Transform (IFFT) processing on the signal, and adds the CP to the signal resulting from the IFFT. Moreover, transmitter 107 performs RF processing such as D/A conversion and/or up-conversion on the signal and transmits the resulting radio signal to terminal 200 via an antenna.

Receiver 108, for example, performs RF processing such as down-conversion and/or A/D conversion on an uplink signal from terminal 200 received via an antenna. Further, in the case of the OFDM transmission, receiver 108 performs Fast Fourier Transform (FFT) processing on the received signal and outputs the resulting frequency-domain signal to extractor 109.

Extractor 109, for example, extracts from the received signal inputted from receiver 108, based on the information inputted from controller 101, a radio resource part with which at least one of the uplink data signal (e.g., PUSCH) and the uplink control signal (e.g., PUCCH) has been transmitted and then outputs the extracted radio resource part to demodulator 110.

Demodulator 110, for example, demodulates the uplink data signal (e.g., PUSCH) or the uplink control signal (e.g., PUCCH) inputted from extractor 109, based on the information inputted from controller 101. Demodulator 110, for example, outputs a demodulation result to decoder 111.

Decoder 111, for example, performs error correction decoding on the uplink data signal (e.g., PUSCH) or the uplink control signal (e.g., PUCCH), based on the information inputted from controller 101 and the demodulation result inputted from demodulator 110, thereby obtaining a reception bit sequence (e.g., UCI or UL data signal) after the decoding.

[Configuration of Terminal]

Figure 7:
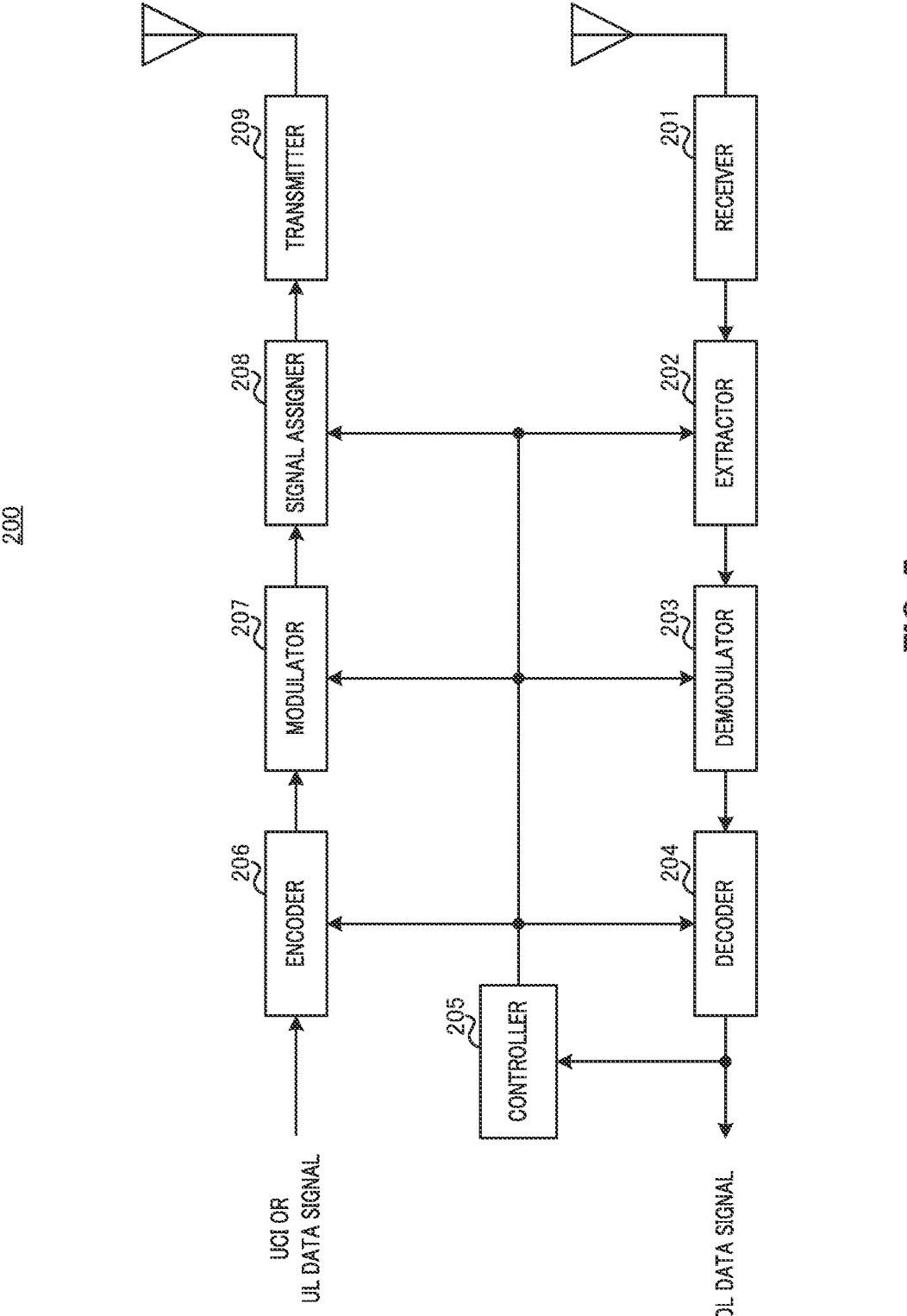
FIG. 7 is a block diagram illustrating an exemplary configuration of the terminal.

FIG. 7 is a block diagram illustrating an exemplary configuration of terminal 200 according to an exemplary embodiment of the present disclosure. For example, in FIG. 7, terminal 200 includes receiver 201, extractor 202, demodulator 203, decoder 204, controller 205, encoder 206, modulator 207, signal assigner 208, and transmitter 209.

Receiver 201, for example, receives a downlink signal (e.g., downlink data signal or downlink control information) from base station 100 via an antenna and performs the RF processing such as the down-conversion and/or the A/D conversion on the received radio signal, thereby obtains a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts a radio resource part that may include the downlink control information from the received signal inputted from receiver 201, based on information on the radio resource for the downlink control information inputted from controller 205, and then outputs the radio resource part to demodulator 203. Further, extractor 202 extracts a radio resource part that includes downlink data, based on information on the radio resource for a data signal inputted from controller 205, and then outputs the radio resource part to demodulator 203.

Demodulator 203, for example, based on the information inputted from controller 205, demodulates the signal (e.g., PDCCH or PDSCH) inputted from extractor 202 and outputs a demodulation result to decoder 204.

Decoder 204, for example, based on the information inputted from controller 205, performs error correction decoding on PDCCH or PDSCH, using the demodulation result inputted from demodulator 203, thereby obtaining downlink reception data, a higher-layer control signal, or downlink control information, for example. Decoder 204 outputs the higher-layer control signal and the downlink control information to controller 205, and outputs the downlink reception data. Further, decoder 204 may generate a response signal (e.g., ACK/NACK) based on the decoding result of the downlink reception data and output the generated response signal to encoder 206.

Controller 205, for example, determines a radio resource for at least one of a PDSCH reception, a PUSCH transmission, and a PUCCH transmission, based on the signal inputted from decoder 204 (e.g., higher-layer control signal and downlink control information). Controller 205 also determines (or identifies) DMRS configurations for a plurality of slots/Repetitions based on the signal inputted from decoder 204 (e.g., information on DMRS configuration pattern). Controller 205 outputs the determined information to extractor 202, demodulator 203, encoder 206, modulator 207, and signal assigner 208, for example.

Encoder 206, for example, performs error correction encoding on a UCI (UCI sequence) or an uplink data signal, based on the information inputted from controller 205. Encoder 206 outputs the encoded bit sequence to modulator 207.

Modulator 207, for example, based on the information inputted from controller 205, modulates the encoded bit sequence inputted from encoder 206 and outputs the modulated signal (symbol sequence) to signal assigner 208.

Signal assigner 208, for example, based on the information inputted from controller 205, maps the signal inputted from modulator 207 to a radio resource. Further, signal assigner 208 maps a DMRS to a radio resource, based on information on a DMRS configuration pattern (e.g., DMRS arrangement and the number of symbols) included in the information inputted from the controller. Signal assigner 208 outputs, to transmitter 209, the uplink signal to which the signal is mapped.

Transmitter 209, for example, performs transmission signal-waveform generation such as OFDM on the signal inputted from signal assigner 208. In addition, in the case of the OFDM transmission using the CP, for example, transmitter 209 performs the IFFT processing on the signal and adds the CP to the signal after the IFFT Alternatively, when transmitter 209 generates a single-carrier waveform, a Discrete Fourier Transformer (DFT) may be additionally provided at a rear stage of modulator 207 or a front stage of signal assigner 208 (neither is illustrated), for example. Moreover, transmitter 209, for example, performs the RF processing such as the D/A conversion and/or the up-conversion on a transmission signal and transmits the resulting radio signal to base station 100 via an antenna.

[Exemplary Operations of Base Station 100 and Terminal 200]

Exemplary operations of base station 100 and terminal 200 having the above configurations will be described.

Figure 8:
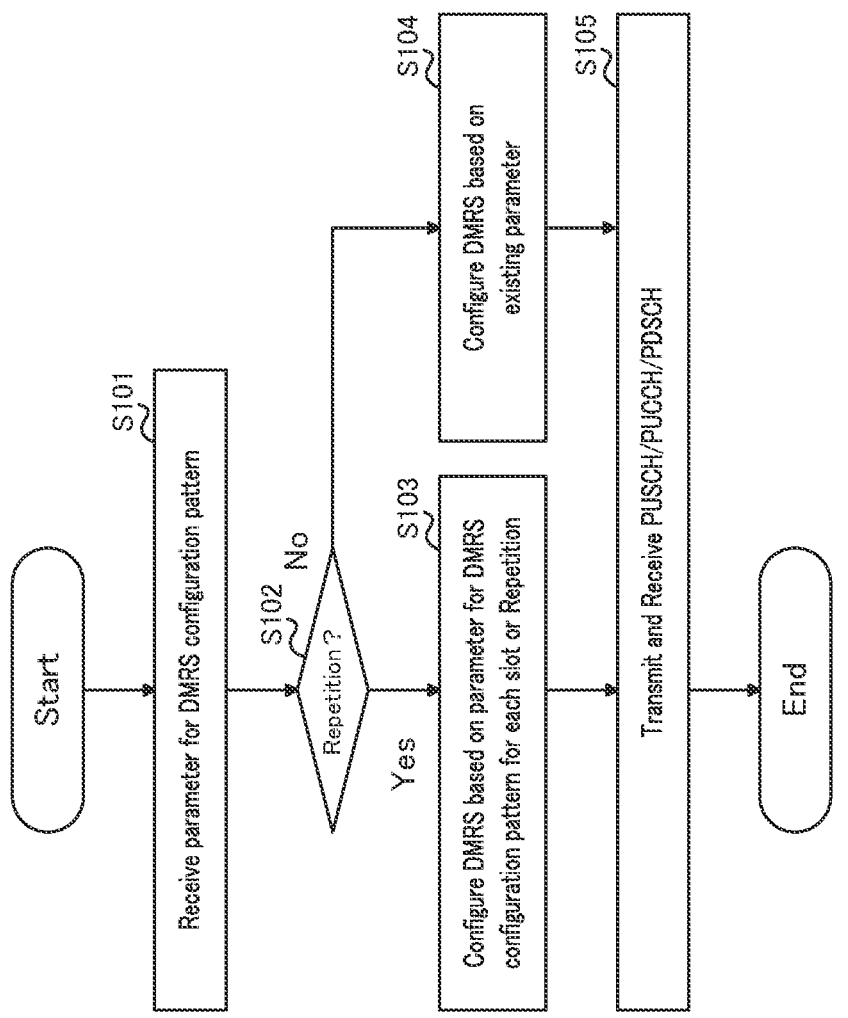
FIG. 8 is a flowchart describing an exemplary transmission operation in the terminal.

FIG. 8 is a flowchart describing an exemplary operation relating to a DMRS configuration in terminal 200.

In FIG. 8, terminal 200 receives a parameter (or information) for a DMRS configuration pattern, for example (S101). Note that terminal 200 may receive, in addition to the parameter for the DMRS configuration pattern, information for determining a DMRS configuration for each slot/Repetition (e.g., parameter specified in NR Rel. 15/16), for example.

Terminal 200, for example, determines whether to perform a repetition transmission (e.g., Repetition or joint channel estimation) in transmission of an uplink signal (e.g., PUSCH or PUCCH) and reception of a downlink signal (e.g., PDSCH) (S102).

When performing the repetition transmission (S102: Yes), terminal 200, for example, configures DMRS based on the parameter for the DMRS configuration pattern for each slot/Repetition (e.g., dmrs-AdditionalPositionPattern to be described later) (S103).

On the other hand, when not performing the repetition transmission (S102: No), terminal 200 configures DMRS based on, for example, an existing parameter (e.g., parameter specified in NR Rel. 15/16, for example, dmrs-AdditionalPosition included in DMRS-UplinkConfig) (S104).

Terminal 200 may, for example, perform at least one of the transmission of the uplink signal (e.g., PUSCH or PUCCH) and the reception of the downlink signal (e.g., PDSCH), based on the DMRS configuration (S105).

Incidentally, in S102, terminal 200 may, for example, compare the number of Repetitions (or the number of times of repetition) and a threshold, without limitation to the determination whether to perform the Repetition. For example, terminal 200 may perform processing of S103 when the number of Repetitions is equal to or larger than the threshold, and may perform processing of S104 when the number of Repetitions is less than the threshold.

Next, an example of configuring (or indicating) a DMRS configuration pattern will be described.

In the present embodiment, for example, base station 100 may configure a parameter (e.g., a plurality of candidates for DMRS configuration pattern) for determining the DMRS configuration pattern for each slot/Repetition, for an information element (JE) of a higher layer (e.g., RRC) that configures the information on a time-domain resource for transmitting PUSCH.

For example, base station 100 may configure information indicating any one of the plurality of candidates in the parameter for determining the DMRS configuration pattern for each slot/Repetition, for resource-allocation information included in the downlink control information (DCI) or the RRC.

For example, terminal 200 may determine the DMRS configuration pattern for each slot/Repetition based on the resource-allocation information included in the downlink control information (DCI) or the RRC and the parameter for determining the DMRS configuration pattern.

The information element herein of the RRC that configures the information on the time-domain resource with which PUSCH is transmitted (e.g., information element relating to configuration of time-domain resource to which PUSCH is assigned) may be, for example, "PUSCH-TimeDomainResourceAllocation IE" (see, e.g., NPL 7).

The PUSCH-TimeDomainResourceAllocation may include, for example, parameters for information on the timing of how many slots later terminal 200 transmits PUSCH from the slot in which the terminal has received PDCCH, the start symbol position of PUSCH in a slot, the number of symbols for transmitting PUSCH, and the number of Repetitions (e.g., parameters in PUSCH-Allocation-r16). For example, base station 100 may configure information (e.g., TDRA table or puschAllocationList-r16) on candidates for a combination of these parameters. Terminal 200 may select one of the plurality of combination candidates of parameters for a PUCSH transmission to be actually used by terminal 200, based on the DCI or RRC (e.g., a few bits) that assign the corresponding uplink data channel (PUSCH), for example.

In the present embodiment, for example, as illustrated in FIG. 9, the PUSCH-TimeDomainResourceAllocation IE (e.g., PUSCH-Allocation-r16) may include a parameter (e.g., denoted as "dmrs-AdditionalPositionPattern") for determining the DMRS configuration pattern for each slot/Repetition. Therefore, for example, a plurality of candidates for a PUSCH assignment (e.g., PUSCH-Allocation-r16) including the parameter "dmrs-AdditionalPositionPattern" may be configured for the PUSCH-TimeDomainResourceAllocation.

According to the present embodiment, terminal 200 determines the DMRS configuration pattern for each slot/Repetition, based on the indication of the time-domain resource allocation for PUSCH by the DCI or the RRC (e.g., information (index) indicating any of candidates in TDRA table), for example. Thus, the dmrs-AdditionalPositionPattern is included in the information element of the RRC specified in NR Rel. 15/16, which causes no increase in signaling overhead for the indication of the DMRS configuration pattern.

Further, the DMRS configuration pattern for each slot/Repetition suitable for the channel estimation (e.g., joint channel estimation) depends on, for example, the time-domain resource allocation (e.g., the number of symbols or the number of Repetitions). In the present embodiment, base station 100 can configure the DMRS configuration pattern suitable for the combination of parameters for each time-domain resource allocation, for example. Therefore, according to the present embodiment, for example, the DMRS configuration for each slot/Repetition can be dynamically configured in accordance with a channel state, thus improving the channel estimation accuracy.

Incidentally, in NR Rel. 15/16, the DMRS configuration that is common to each slot/Repetition is configured by the parameter "dmrs-AdditionalPosition" included in a "DMRS-UplinkConfig," which is an information element for configuring information on DMRS in uplink (hereinafter may also be referred to as an "uplink DMRS"). In the present embodiment, for example, when a parameter (e.g., dmrs-AdditionalPositionPattern) for determining the DMRS configuration pattern specific to each slot/Repetition is configured for the PUSCH-TimeDomainResourceAllocation IE, terminal 200 may use a configuration of the dmrs-Additional-PositionPattern in preference to a configuration of the dmrs-AdditionalPosition.

Thus, for the DMRS configuration in the repetition transmission, terminal 200 may use the PUSCH-TimeDomain-ResourceAllocation IE in preference to the DMRS-UplinkConfig IE. In other words, terminal 200 may ignore the configuration of the dmrs-AdditionalPosition when the dmrs-AdditionalPositionPattern) is configured for the PUSCH-TimeDomainResourceAllocation IE.

In the following, a description will be given of a configuration example of the PUSCH-TimeDomainResourceAllocation IE in the present embodiment. Examples of parameters for determining the DMRS configuration pattern for each slot/Repetition (e.g., dmrs-AdditionalPositionPattern) will be described below.

[Option 1-1]

In Option 1-1, for example, a plurality of patterns (candidates) for the DMRS configuration in each slot/Repetition is previously defined, and one of the patterns may be configured for the dmrs-AdditionalPositionPattern.

FIG. 10 illustrates an example of PUSCH-Allocation-r16 in Option 1-1. The Dmrs-AdditionalPositionPattern illustrated in FIG. 10 may include, for example, any one of four candidates for the DMRS configuration pattern (pattern 1, pattern 2, pattern 3, and pattern 4) for each slot/Repetition.

FIG. 11 illustrates examples of the previously defined DMRS configuration patterns (e.g., candidates) for each slot/Repetition.

Herein, a dmrs-AdditionalPosition is an existing parameter for indicating one of combinations of four types of DMRS arrangements and the numbers of DMRS symbols (e.g., pos 0, pos 1, pos 2, and pos 3). The Dmrs-AdditionalPosition is included in a DMRS-UplinkConfig, which is an information element for configuring information on an uplink DMRS.

In FIG. 11, for example, in each of the DMRS configuration patterns, a DMRS configuration (any of pos 0 to pos 3) specified by the dmrs-AdditionalPosition may be configured for the first and third slots/Repetitions (1st repetition and 3rd repetition). Further, a previously specified DMRS configuration may be configured for the second slot/Repetition (2nd repetition). The DMRS configuration specified for the second slot/Repetition may be, for example, any one of pos 0 to pos 3. For example, the DMRS configuration for the second slot/Repetition may be different from the DMRS configuration for the first and third slots/Repetitions.

The DMRS configuration patterns (pattern 1 to pattern 4) illustrated in FIG. 11 allow base station 100 to, for example, configure, for terminal 200, a DMRS configuration specific to each of the plurality of slots/Repetitions to which the joint channel estimation is applied.

The previously defined DMRS configuration pattern for each slot/Repetition is not limited to the examples illustrated in FIG. 11. For example, the number of candidates for the DMRS configuration patterns for slots/Repetitions included in the dmrs-AdditionalPositionPattern is not limited to four and may be other numbers. In addition, for example, in each pattern, the DMRS configuration specified by the dmrs-AdditionalPosition included in the DMRS-UplinkConfig may not be included.

In Option 1-1, for example, the number of bits of the RRC used for indicating the dmrs-AdditionalPositionPattern depends on the number of patterns (number of candidates). In one example, the number of bits used for configuring the dmrs-AdditionalPositionPattern in one PUSCH-Allocation-r16 is $\log_2(P)$ bits for the number of patterns P. For example, in the example of FIG. 10, since the number of patterns P is four, the number of bits used for configuring one PUSCH-Allocation-r16 is two bits. For example, the smaller the number of patterns P is, the more RRC overhead can be reduced.

[Option 1-2]

In Option 1-2, for example, the DMRS configuration pattern for each of the slots/Repetitions may be configured by the RRC.

FIG. 12 illustrates an example of PUSCH-Allocation-r16 in Option 1-2. The dmrs-AdditionalPositionPattern illustrated in FIG. 12 may include, for example, a DMRS configuration (e.g., any of pos 0, pos 1, pos 2, and pos 3 of dmrs-AdditionalPosition) for each of the slots/Repetitions the number of which is "numberOfRepetitions-r16" corresponding to the number of Repetitions.

In Option 1-2, the indication of the dmrs-AdditionalPositionPattern allows base station 100 to flexibly configure, for terminal 200, the DMRS configuration (e.g., any of pos 0, pos 1, pos 2, and pos 3) for each slot/Repetition.

Option 1-1 and Option 1-2 have been each described, thus far.

Figure 13:
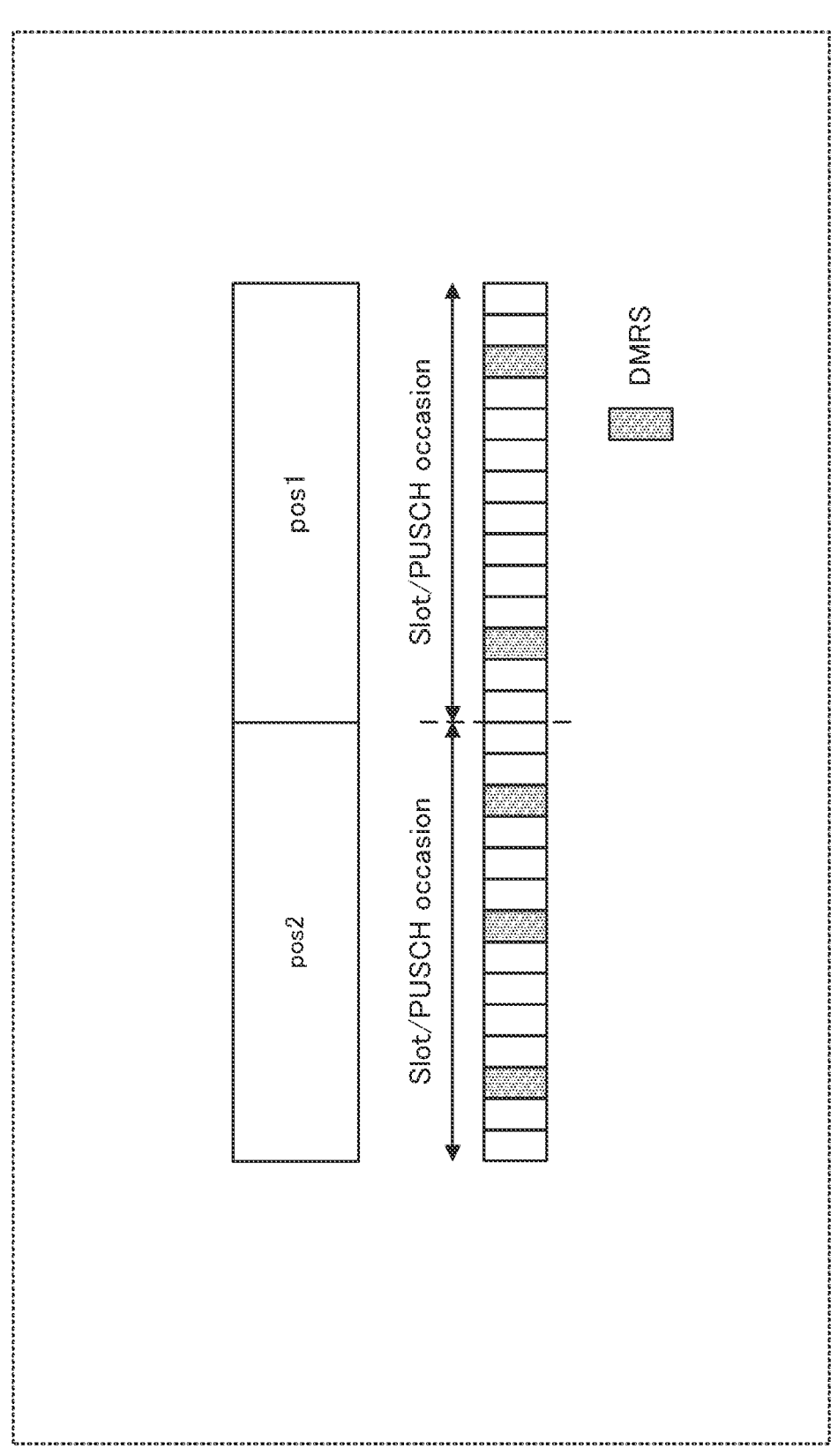
FIG. 13 illustrates an exemplary DMRS configuration in repetition of PUSCH according to Embodiment 1.

FIG. 13 illustrates an exemplary DMRS arrangement using the dmrs-AdditionalPositionPattern in the present embodiment. FIG. 13 illustrates an example in which the number of Repetitions is twice.

FIG. 13 illustrates an exemplary DMRS arrangement of a case where pattern 1 is configured for the dmrs-AdditionalPositionPattern whereas the dmrs-AdditionalPosition is pos 2 in FIG. 11 of Option 1-1, for example. Similarly, FIG. 13 illustrates an exemplary DMRS arrangement of a case where {pos 2, pos 1} are configured for the dmrs-AdditionalPositionPattern in Option 1-2, for example.

As illustrated in FIG. 13, different DMRS configurations for the respective slots/Repetitions (i.e., individual DMRS arrangement) can be configured. Thus, for example, in FIG. 13, since the number of DMRS symbols for the second slot/Repetition is reduced compared with the number of DMRS symbols for the first slot/Repetition, a resource to which data is mappable can be increased in the second slot/Repetition, thereby improving the transmission performance or transmission efficiency of the PUSCH repetition.

In the manner described above, in the present embodiment, base station 100 and terminal 200 make a configuration of a DMRS to be assigned to a certain slot/Repetition section in repetition and a configuration of a DMRS to be assigned to another slot/Repetition in the repetition different from each other, for example. Additionally, in the present embodiment, terminal 200 determines the DMRS configuration specific to each slot/Repetition, based on, for example, an information element of the RRC including a plurality of candidates for the DMRS configuration pattern specific to each slot/Repetition and a control signal included in the DCI or the RRC, which indicates any one of the plurality of candidates for the DMRS configuration pattern.

Further, in the present embodiment, the RRC, which configures the information on the plurality of candidates for the DMRS configuration pattern for each of the plurality of slots/Repetitions, includes an information element relating to a configuration of a time-domain resource to which PUSCH is assigned (e.g., PUSCH-TimeDomainResourceAllocation IE), for example.

Thus, for example, base station 100 can appropriately configure a DMRS configuration pattern in according with the configurations of PUSCH such as the number of slots/Repetitions to which the joint channel estimation is applied or the time-resource allocation for each slot/Repetition.

Further, according to the present embodiment, for example, the existing indication of the time-resource allocation for PUSCH (e.g., configuration specified in NR Rel. 15/16) can be used for the configurations of the time-resource allocation and the DMRS arrangement for each slot/Repetition to which the joint channel estimation is applied, and thus, the impact of indications of the DMRS configuration patterns for the plurality of slots/Repetitions is small on the specifications.

Hence, according to the present embodiment, the signaling overhead can be suppressed and DMRS can be thus flexibly configured.

Further, the DMRS configurations applied to the respective slots/Repetitions to which the joint channel estimation is applied may be, for example, combinations of DMRS arrangements and the numbers of DMRS symbols specified in NR Rel. 15/16 (e.g., pos 0, pos 1, pos 2, and pos 3). This eliminates the need for adding a new combination of the DMRS arrangement and the number of DMRS symbols in order to apply the joint channel estimation, thus suppressing the complexity of the hardware and software processing of the DMRS generation in the transmitter and the hardware and software processing of the joint channel estimation in the receiver.

(Variation 1)

In Variation 1, for example, a DMRS configuration pattern for each slot/Repetition may be specific to a Repetition method (e.g., type of repetition transmission). Examples of the repetition methods may include, for example, PUSCH repetition Type A and PUSCH repetition Type B. For example, individual DMRS configuration patterns may be configured for PUSCH repetition Type A and PUSCH repetition Type B, respectively.

FIG. 14 illustrates an example in which a DMRS configuration pattern is individually configured for PUSCH repetition Type A and PUSCH repetition Type B in Option 1-1. Further, FIG. 15 illustrates an example in which a DMRS configuration pattern is individually configured for PUSCH repetition Type A and PUSCH repetition Type B in Option 1-2.

As illustrated in FIGS. 14 and 15, the PUSCH-Allocation-r16 may include, for example, a parameter for determining the DMRS configuration pattern for each slot/Repetition for PUSCH repetition Type A (e.g., dmrs-AdditionalPosition-PatternTypeA) and a parameter for determining the DMRS configuration pattern for each slot/Repetition for PUSCH repetition Type B (e.g., dmrs-AdditionalPositionPattern-TypeB).

According to Variation 1, base station 100 can appropriately determine a DMRS configuration depending on a Repetition method, for example.

(Variation 2)

In the above embodiment, as an example, a case has been described where a value of the dmrs-AdditionalPosition (e.g., any of pos 0, pos 1, pos 2, and pos 3) included in the DMRS-UplinkConfig is configured for the parameter for determining the DMRS configuration pattern for each slot/Repetition (e.g., dmrs-AdditionalPositionPattern). However, a parameter (e.g., dmrs-AdditionalPositionPattern) that can be individually configured for each slot/Repetition is not limited to this case.

In Variation 2, for example, a parameter (e.g., dmrs-AdditionalPositionPattern) that can be individually configured for each slot/Repetition may be a value corresponding to at least one of parameters relating to the DMRS arrangement (or DMRS position) and the number of DMRS symbols and other parameters for DMRS.

For example, the parameters for DMRS may include a DMRS type and a DMRS length.

FIG. 16 illustrates an example of PUSCH-Allocation-r16 according to Variation 2. The dmrs-AdditionalPositionPattern illustrated in FIG. 16 may include, for example, a DMRS configuration (e.g., value of DMRS-UplinkConfig) for each of the slots/Repetitions the number of which is "numberOfRepetitions-r16" corresponding to the number of Repetitions.

Here, the DMRS-UplinkConfig is an information element for configuring information on an uplink DMRS and may include, for example, parameters such as a DMRS arrangement and the number of DMRS symbols (dmrs-Additional-Position), a DMRS type (dmrs-Type), and a DMRS length (maxLength) in each of the slots/Repetitions.

According to Variation 2, a detailed configuration can be made for DMRS in each slot/Repetition. Therefore, for example, the channel estimation accuracy can be improved by the DMRS configuration in accordance with the channel state in each slot/Repetition.

(Variation 3)

In the above embodiment, as an example, a case has been described where the size of parameter (e.g., dmrs-AdditionalPositionPattern) for determining the DMRS configuration pattern for each slot/Repetition is configured to be identical to the number of Repetitions (e.g., numberOfRepetitions). However, the size of DMRS configuration pattern (e.g., dmrs-AdditionalPositionPattern) may be different from the number of Repetitions.

For example, the size of dmrs-AdditionalPositionPattern may be a size that is previously defined or a size to be configured by the RRC. According to Variation 3, for example, when the size of dmrs-AdditionalPositionPattern is smaller than the number of Repetitions, an increase in the RRC overhead can be suppressed.

Figure 17:
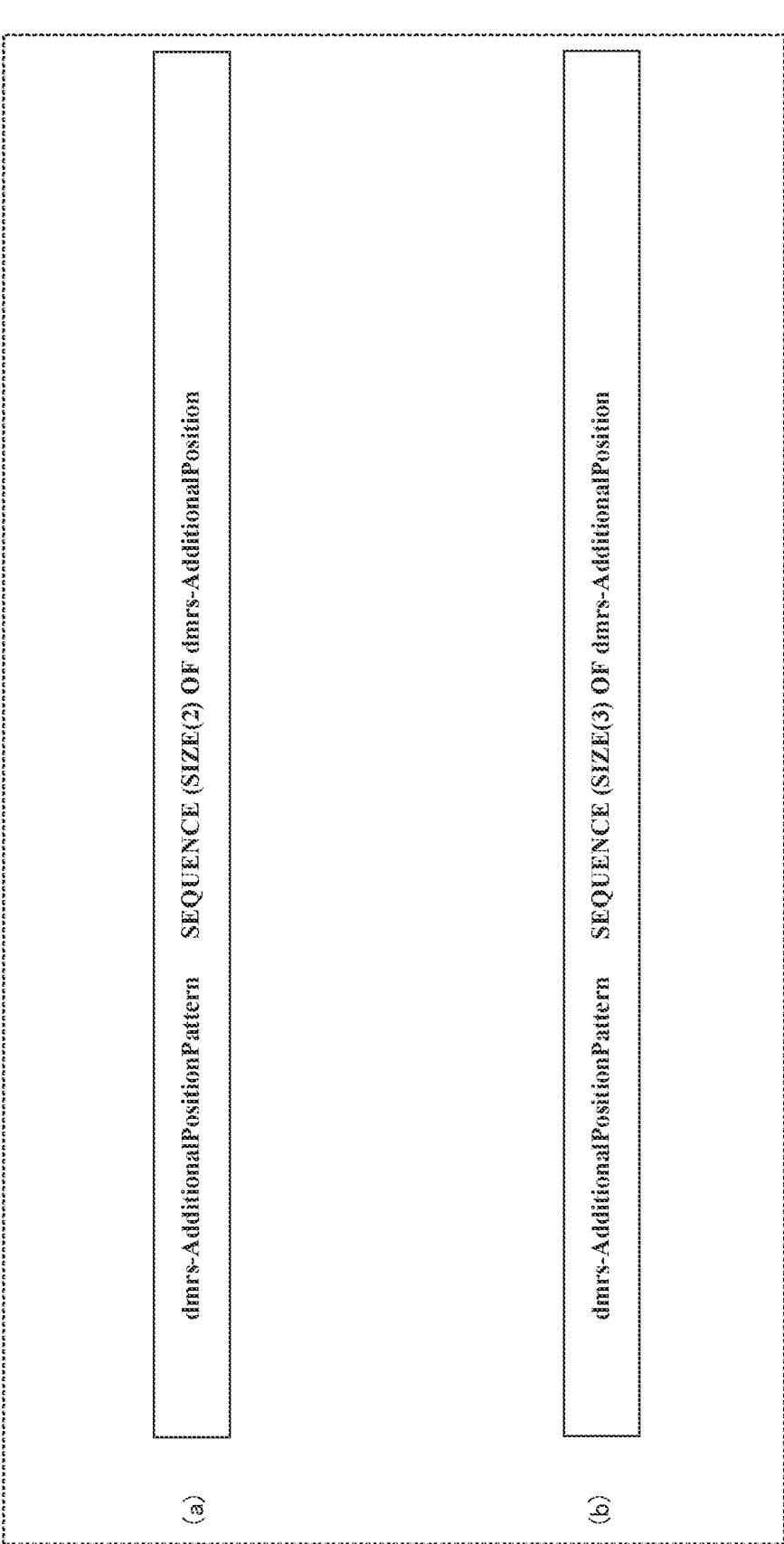
FIG. 17 illustrates exemplary parameters relating to a DMRS configuration pattern according to Variation 3.

In one example, when the size of dmrs-AdditionalPositionPattern is two, the dmrs-AdditionalPositionPattern in Option 1-2 may be configured as in (a) of FIG. 17.

For example, the DMRS configuration for an initial PUSCH transmission (1st repetition) may be determined based on a first element of the dmrs-AdditionalPositionPattern, whereas the DMRS configurations for the other PUSCH transmissions may be determined based on a second element of the dmrs-AdditionalPositionPattern. For example, it is effective in speeding up the decoding processing to configure the number of DMRS symbols for the initial PUSCH transmission to be larger than the numbers of DMRS symbols for the other PUSCH transmissions.

Further, for example, when the size of dmrs-AdditionalPositionPattern is three, the dmrs-AdditionalPositionPattern in Option 1-2 may be configured as in (b) of FIG. 17.

For example, the DMRS configuration for the initial PUSCH transmission (1st repetition) may be determined based on the first element of the dmrs-AdditionalPosition-Pattern, the DMRS configuration for the last PUSCH transmission (last repetition) may be determined based on the second element of the dmrs-AdditionalPositionPattern, and the DMRS configurations for PUSCH transmissions different from the initial and last PUSCH transmissions may be determined based on a third element. Improving the flexibility of the DMRS configurations in the leading and trailing PUSCH transmissions is useful in interpolation in time domain of channel estimation values in the inter-slot channel estimation, for example.

Further, for example, when the size of dmrs-AdditionalPositionPattern is N, the DMRS configuration for the m-th PUSCH transmission (m-th repetition) may be determined based on the (m mod N)-th element. In other words, when the size, N, of dmrs-AdditionalPositionPattern is less than the number of Repetitions, DMRS configurations corresponding to the respective elements of the dmrs-AdditionalPositionPattern may be repeatedly applied.

An association of the order of PUSCH transmissions and the elements of the dmrs-AdditionalPositionPatterns is not limited to the above-mentioned examples.

Embodiment 2

The configurations of the base station and the terminal according to the present embodiment may be the same as the configurations of base station 100 and terminal 200 according to Embodiment 1.

In the present embodiment, base station 100 may, for example, configure a parameter for determining the DMRS configuration pattern for each slot/Repetition, for an information element for configuring information on DMRS in uplink (e.g., information element relating to configuration of uplink DMRS).

Further, terminal 200, for example, may determine the DMRS configuration pattern for each slot/Repetition, at least based on an information element for which the parameter is configured.

The information element herein for configuring the information on the uplink DMRS may be, for example, "DMRS-UplinkConfig IE" (see, e.g., NPL 7).

In the present embodiment, for example, as illustrated in FIG. 18, the DMRS-UplinkConfig IE may include a parameter (e.g., denoted as "dmrs-AdditionalPositionPattern") for determining the DMRS configuration pattern for each slot/Repetition. Therefore, for example, a parameter set relating to the DMRS configurations including the parameter "dmrs-AdditionalPositionPattern" may be configured for the DMRS-UplinkConfig.

According to the present embodiment, the dmrs-AdditionalPositionPattern is included in the information element for configuring the information on the uplink DMRS, and the parameters for the DMRS configuration are thereby aggregated into a single information element, thus simplifying a configuration of the RRC.

In the following, a description will be given of a configuration example of the DMRS-UplinkConfig IE in the present embodiment. Examples of parameters for determining the DMRS configuration pattern for each slot/Repetition (e.g., dmrs-AdditionalPositionPattern) will be described below.

For example, in FIG. 18, the "dmrs-AdditionalPosition" is a parameter for indicating any one of the four types of combinations (pos 0, pos 1, pos 2, and pos 3) of DMRS arrangements and the numbers of DMRS symbols. Incidentally, when the dmrs-AdditionalPosition is null, pos 2 is configured.

For example, in FIG. 18, the "dmrs-AdditionalPositionPattern" can individually configure any of values of the dmrs-AdditionalPosition (e.g., any of pos 0, pos 1, pos 2, and pos 3), for each of the slots/Repetitions the number of which is "maxNrofRepetition" corresponding to the number of Repetitions.

Thus, in the present embodiment, base station 100 and terminal 200 make a configuration of a DMRS to be assigned to a certain slot/Repetition section in repetition and a configuration of a DMRS to be assigned to another slot/Repetition in the repetition different from each other. Further, in the present embodiment, the RRC, which configures the information on the plurality of candidates for the DMRS configuration pattern for each of the plurality of slots/Repetitions, includes an information element relating to s configuration of an uplink DMRS (e.g., DMRS-UplinkConfig IE).

In the manner described above, according to the present embodiment, for example, the existing indication of the DMRS configuration in uplink (e.g., configuration specified in NR Rel. 15/16) can be used for the configurations of the time-resource allocation and the DMRS arrangement for each slot/Repetition to which the joint channel estimation is applied, and thus, the impact of indications of the DMRS configuration patterns for the plurality of slots/Repetitions is small on the specification.

Hence, according to the present embodiment, the signaling overhead can be suppressed and DMRS can be flexibly configured.

Further, the DMRS configurations applied to the respective slots/Repetitions to which the joint channel estimation is applied may be, for example, combinations of DMRS arrangements and the numbers of DMRS symbols specified in NR Rel. 15/16 (e.g., pos 0, pos 1, pos 2, and pos 3). This eliminates the need for adding a new combination of the DMRS arrangement and the number of DMRS symbols in order to apply the joint channel estimation, thus suppressing the complexity of the hardware and software processing of the DMRS generation in the transmitter and the hardware and software processing of the joint channel estimation in the receiver.

Incidentally, the present embodiment is not limited to a method of adding the dmrs-AdditionalPositionPattern to the DMRS-UplinkConfig, and the dmrs-AdditionalPosition, which is the existing parameter, may be extend to multiple dimensions, for example. For example, when the number of Repetitions is N, the DMRS configuration patterns for the respective slots/Repetitions may be determined based on N elements sequentially from the first element of the dmrs-AdditionalPosition. When no Repetition is applied, the DMRS configuration pattern may be determined based on the first element of the dmrs-AdditionalPosition. Note that the elements of the dmrs-AdditionalPosition that are configured in the case of application of the Repetition in number N or no Repetition are not limited to the elements in order from the first element.

(Variation 4)

In Variation 4, for example, the size of dmrs-AdditionalPositionPattern or dmrs-AdditionalPosition of a case where the dmrs-AdditionalPosition, which is the existing parameter, is extended to the multiple dimensions may be different from the number of Repetitions.

For example, the size of dmrs-AdditionalPositionPattern or dmrs-AdditionalPosition of a case where the dmrs-AdditionalPosition, which is the existing parameter, is extended to the multiple dimensions may be a size that is previously defined or a size to be configured by the RRC. According to Variation 4, for example, when the size of dmrs-AdditionalPositionPattern is smaller than the number of Repetitions, an increase in the RRC overhead can be suppressed.

For example, when the size of dmrs-AdditionalPositionPattern (e.g., of DMRS configuration pattern) is two, the DMRS configuration for an initial PUSCH transmission (1st repetition) may be determined based on a first element of the dmrs-AdditionalPositionPattern, whereas the DMRS configurations for the other PUSCH transmissions may be determined based on a second element of the dmrs-AdditionalPositionPattern. For example, it is effective in speeding up the decoding processing to configure the number of DMRS symbols for the initial PUSCH transmission to be larger than the numbers of DMRS symbols for the other PUSCH transmissions.

Further, for example, when the size of dmrs-Additional-PositionPattern is three, the DMRS configuration for the initial PUSCH transmission (1st repetition) may be determined based on the first element of the dmrs-AdditionalPositionPattern, the DMRS configuration for the last PUSCH transmission (last repetition) may be determined based on the second element of the dmrs-AdditionalPositionPattern, and the DMRS configurations for PUSCH transmissions different from the initial and last PUSCH transmissions may be determined based on a third element. Improving the flexibility of the DMRS configurations in the leading and trailing PUSCH transmissions is useful in interpolation in time domain of channel estimation values in the inter-slot channel estimation, for example.

Further, for example, when the size of dmrs-Additional-PositionPattern is N, the DMRS configuration for the m-th PUSCH transmission (m-th repetition) may be determined based on the (m mod N)-th element. In other words, when the size, N, of dmrs-AdditionalPositionPattern is less than the number of Repetitions, DMRS configurations corresponding to the respective elements of the dmrs-AdditionalPositionPattern may be repeatedly applied.

An association of the order of PUSCH transmissions and the elements of the dmrs-AdditionalPositionPatterns is not limited to the above-mentioned examples.
(Variation 5)

In Variation 5, for example, the dmrs-AdditionalPosition-Pattern or the dmrs-AdditionalPosition may be a parameter for configuring the DMRS configuration pattern (combination) for each slot/Repetition. Further, in Variation 5, an information element for configuring information on an uplink DMRS may include a parameter for configuring a plurality of candidates for the DMRS configuration pattern.

FIG. 19 illustrates an exemplary DMRS-UplinkConfig IE according to Variation 5.

The dmrs-AdditionalPositionPattern illustrated in FIG. 19 may include a pattern of a DMRS configuration (e.g., any of elements of dmrs-AdditionalPosition) for each of a plurality (e.g., in number corresponding to maxNrofRepetition) of slots/Repetitions. Meanwhile, the dmrs-AdditionalPosition-PatternList illustrated in FIG. 19 may include a plurality of candidates for a plurality (e.g., in number corresponding to maxNrofPatterns) of patterns (e.g., dmrs-AdditionalPosi-tionPatterns).

Terminal 200 may, for example, select one of the plurality of candidates for the DMRS configuration patterns for a PUCSH transmission to be actually used by terminal 200, based on the DCI or the RRC (e.g., a few bits) that has assigned the corresponding uplink data channel (PUSCH).

At this time, the DMRS configuration pattern in the DMRS-UplinkConfig may be configured (indicated), based on an index that indicates the time-domain resource allocation for the PUSCH transmission (e.g., PUSCH-TimeDo-mainResourceAllocation). Alternatively, a method in which no bit is added for indicating the DCI configuration pattern is possible. For example, the DMRS configuration pattern may be configured correspondingly to a value of another DCI-bit field, without limitation to the index indicating the time-domain resource allocation for the PUSCH transmis-sion. This can suppress an increase in the DCI overhead and can dynamically configure the DMRS configuration pattern.

Besides, some of combinations of the DMRS configura-tion patterns may be activated by a MAC Control Element (CE). For example, terminal 200 may select, based on the DCI, one of the DMRS configuration patterns from the activated combinations of the DMRS configuration patterns. In other words, DMRS configuration patterns that are not activated may not be configured (or selected) for terminal 200.

According to Variation 5, terminal 200 can select an appropriate DMRS configuration pattern that is in accor-dance with a channel state on terminal 200, from the plurality of candidates for the DMRS configuration patterns that is configured by the DMRS-UplinkConfig.
(Variation 6)

In Variation 6, for example, a parameter (e.g., dmrs-AdditionalPositionPattern) for determining the DMRS con-figuration pattern for each slot or Repetition in Embodi-ments 1 and 2 described above may be applied to the DMRS configurations for some of sections of the plurality of slots/Repetitions (e.g., corresponding to first and second sections), and need not be applied to the DMRS configura-tions of the remaining slots/Repetitions (e.g., corresponding to third section).

By way of example, the DMRS configuration for an initial PUSCH transmission (1st repetition) may be determined based on the dmrs-AdditionalPosition, whereas the DMRS configuration for PUSCH transmissions other than the initial transmission may be determined based on the dmrs-Addi-tionalPositionPattern (called Variation 6-1).

Further, for example, the DMRS configurations for the initial PUSCH transmission (1st repetition) and the last PUSCH transmission (last repetition) may be determined based on the dmrs-AdditionalPosition, and the DMRS con-figurations for PUSCH transmissions other than the initial and last PUSCH transmissions may be determined based on the dmrs-AdditionalPositionPattern (called Variation 6-2).

Further, whether to determine the DMRS configurations for some or all of the slots/Repetitions based on the dmrs-AdditionalPositionPattern as in Variation 6-1 and Variation 6-2 may be switchable. Switching of the DMRS configura-tion that is based on the dmrs-AdditionalPositionPattern may be indicated to terminal 200 by the RRC, the MAC-CE, or the DCI, or may be implicitly configured.

Embodiment 3

The configurations of the base station and the terminal according to the present embodiment may be the same as the configurations of base station 100 and terminal 200 accord-ing to Embodiment 1.

In the present embodiment, for example, a symbol offset may be included in a parameter for determining the DMRS configuration pattern for each slot/Repetition.

The symbol offset may indicate, for example, an offset value for a DMRS symbol position specified in NR Rel. 15/16.

The symbol offset may be included in the information element (e.g., PUSCH-TimeDomainResourceAllocation IE) for configuring the information on the time-domain resource with which PUSCH is transmitted, as in Embodiment 1, or may be included in the information element (e.g., DMRS-UplinkConfig) for configuring the information on the uplink DMRS, as in Embodiment 2.

Further, the parameter for configuring the symbol offset may be applied in the same manner as in Embodiments 1 and 2 by being replaced with the "dmrs-AdditionalPositionPat-tern," for example.

Alternatively, the parameter for configuring the symbol offset may be applied in the same manner as in Embodi-ments 1 and 2 by being included, in conjunction with the "dmrs-AdditionalPositionPattern," in the information element for configuring the information on the time-domain resource for transmitting PUSCH or the information element for configuring the information on the uplink DMRS, for example.

FIG. 20 illustrates in (a), as an example, a configuration example of PUSCH-Allocation-r16 of a case where the dmrs-AdditionalPositionPattern is replaced with the parameter for configuring the symbol offset in Option 1-2 of Embodiment 1.

As illustrated in (a) of FIG. 20, the PUSCH-Allocation-r16 may include a parameter (e.g., "dmrs-offsetPattern") indicating a combination (symbol offset pattern) of symbol offsets (e.g., dmrs-offsets) respectively configured for the plurality (e.g., in number corresponding to numberOfRepetitions-r16) of slots/Repetitions.

Herein, the dmrs-offset may be, for example, a parameter indicating how many symbols the DMRS symbol position in each slot/Repetition (e.g., DMRS symbol position configured by dmrs-AdditionalPosition) is shifted. For example, when the number of symbols in a slot or one Repetition is 14 symbols as illustrated in (b) of FIG. 20, the dmrs-offset may be configured with any value from 0 to 13.

Figure 21:
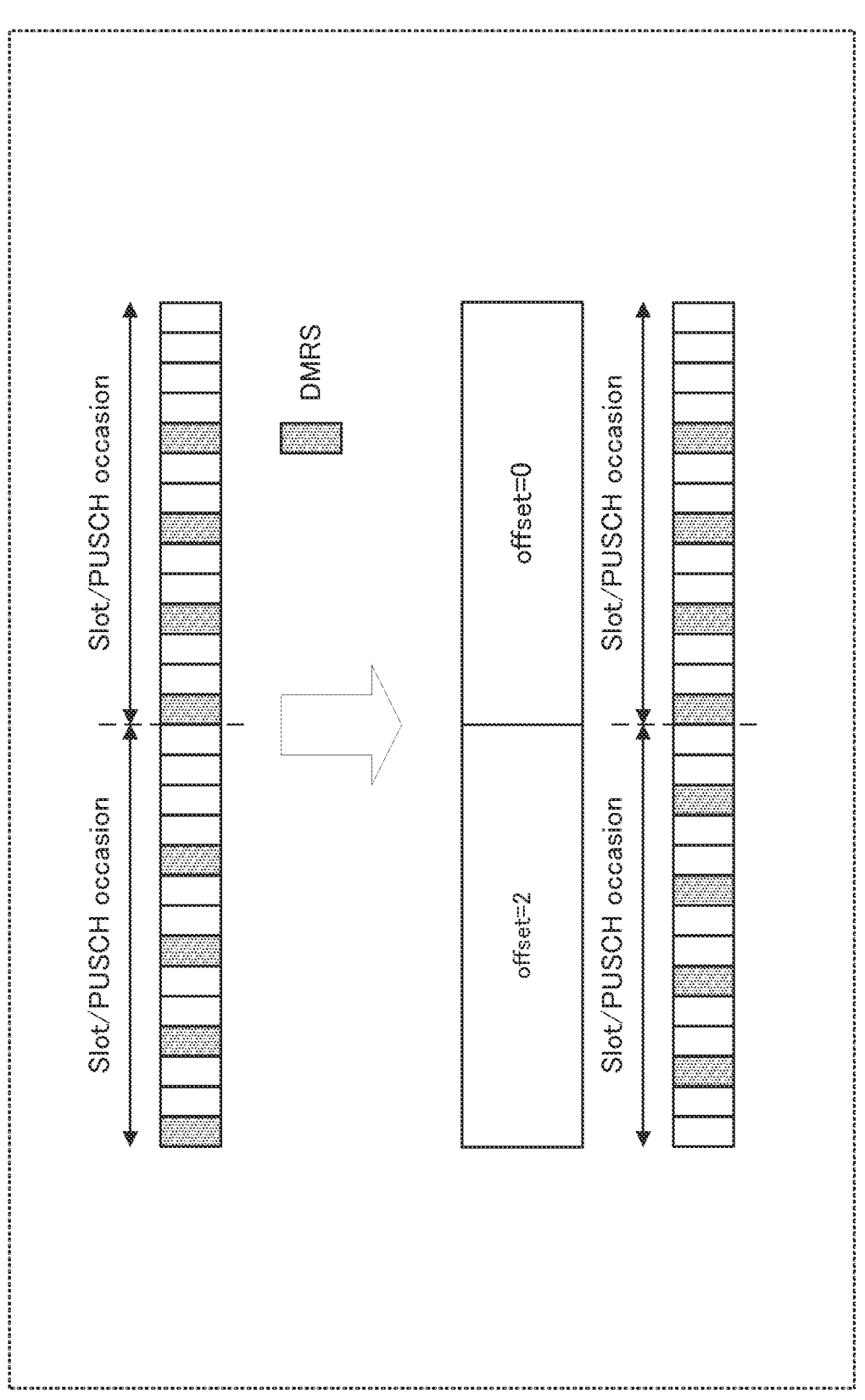
FIG. 21 illustrates an exemplary DMRS configuration in repetition of PUSCH according to Embodiment 3.

FIG. 21 illustrates an exemplary DMRS arrangement using a symbol offset (dmrs-offset) in Embodiment 3. As illustrated in FIG. 21, DMRS symbol positions in each slot/Repetition prior to the application of the symbol offset may be configured to be certain specified positions (e.g., DMRS symbol positions defined in NR Rel. 15/16).

FIG. 21 illustrates an exemplary DMRS arrangement of a case where {2, 0} is indicated to terminal 200 by the dmrs-offset (offset), as an example. As illustrated in FIG. 21, in the first slot/Repetition, offset=2 is configured, and a two-symbol shift is performed for the certain DMRS symbol positions. Further, as illustrated in FIG. 21, in the second slot/Repetition, offset=0 is configured, and a 0-symbol shift is performed for the certain DMRS symbol positions (i.e., no offset).

According to the present embodiment, it is possible to suppress an increase in the DCI overhead and to vary the DMRS arrangement between slots or between Repetitions.

In FIG. 21, a case has been described where the symbol offset that is individually configured for each slot/Repetition is applied to the DMRS symbol positions common to a plurality of slots/Repetitions, but the present disclosure is not limited to this case, and a symbol offset that is individually configured for each slot/Repetition may be applied to a DMRS symbol position specific to each of the plurality of slots/Repetitions, for example.

Additionally, in FIG. 21, a description has been given of the case where the symbol offset indicates an offset in a positive direction for a certain DMRS symbol position: however, not limited thereto, and the symbol offset may indicate an offset in a negative direction.

Further, in the present embodiment, a case has been described where a symbol offset is added to a certain DMRS symbol position, but the present disclosure is not limited to this case, and a formula for calculating (i.e., converting) a new DMRS symbol position may be applied to a certain DMRS symbol position.

Further, in the present embodiment, for example, as an example of an offset for the existing DMRS configuration, an exemplary offset for the DMSR arrangement (or DMRS symbol position) has been described, but the present disclosure is not limited to this, and an offset for the number of DMRS symbols in the existing DMRS configuration (e.g., increase or decrease in the number of symbols) may be configured, for example.

The embodiments according to an exemplary embodiment of the present disclosure have been each described, thus far.

Other Embodiments

1. In the above-described embodiments and variations, for example, a case has been described where any one of the four types of combinations (e.g., pos 0, pos 1, pos 2, and pos 3) of the DMRS arrangements and the numbers of DMRS symbols specified in Rel. 15/16 is configured for each of the slots/Repetitions, but a configuration in which no DMRS is placed in the respective slots/Repetitions (DMRS-less or no-DMRS configuration) may be added.

Besides, other combinations may be configured in addition to or in place of at least one of the four types of combinations (e.g., pos 0, pos 1, pos 2, and pos 3) of the DMRS arrangements and the numbers of DMRS symbols specified in Rel. 15/16.

In the above-described embodiments, a case has been described where the size of DMRS configuration pattern is identical to the number of Repetitions because the DMRS configuration pattern for each slot/Repetition is applied to the Repetition.

For example, frequency hopping may be applied to the Repetition. When the frequency hopping is applied to the Repetition, the size of DMRS configuration pattern may be configured to be identical to a frequency hopping section (e.g., hop duration), and the above-described embodiments may be then applied. For example, the DMRS configuration pattern may be initialized and applied per frequency hopping section.

Figure 22:
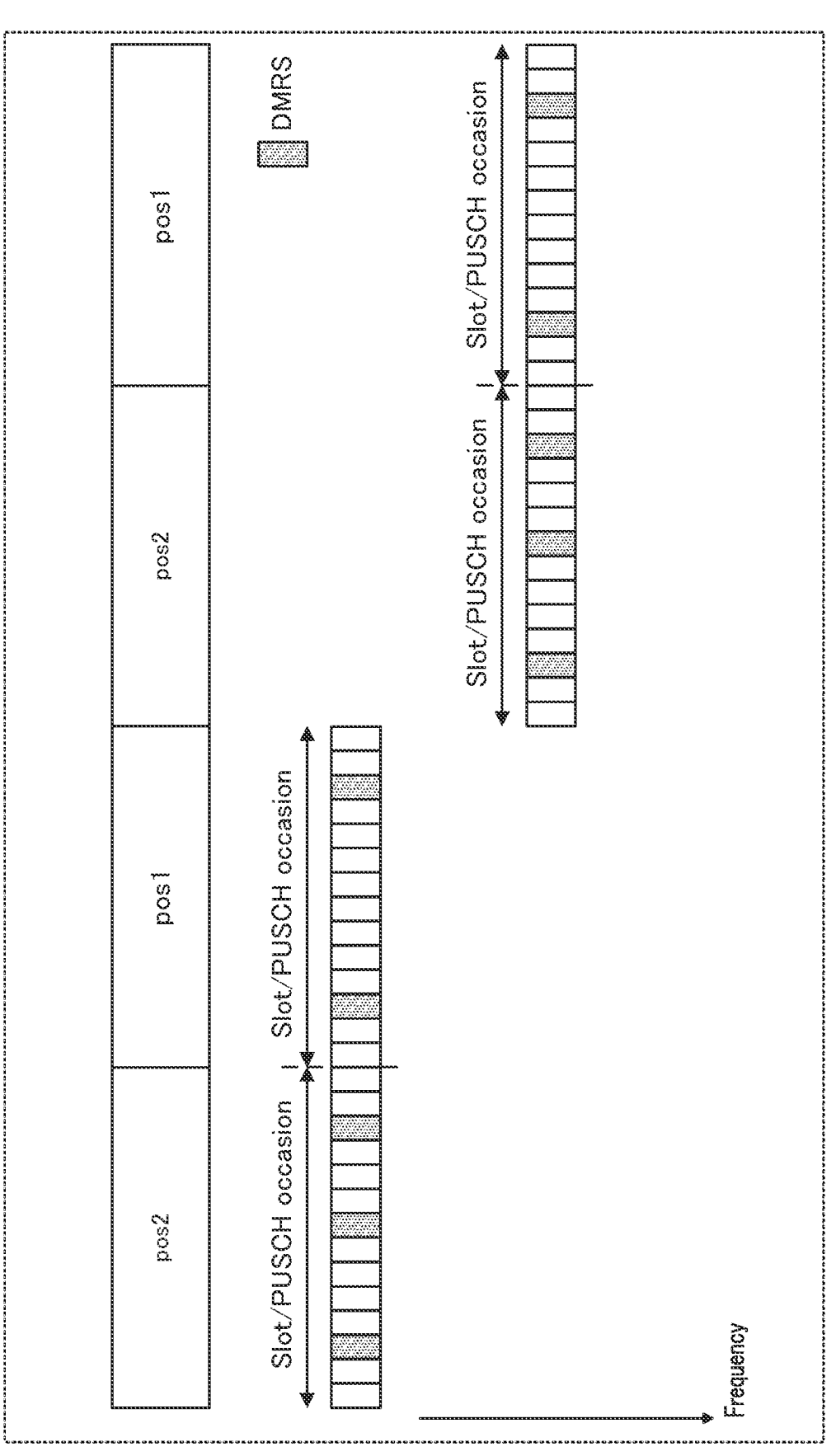
FIG. 22 illustrates an exemplary DMRS configuration in repetition of PUSCH according to another embodiment.

FIG. 22 illustrates an exemplary DMRS arrangement of a case where the frequency hopping is applied to the Repetition. In FIG. 22, for example, the dmrs-AdditionalPositionPattern indicates {pos 2, pos 1, pos 1, pos 1} to terminal 200. In this situation, in terminal 200, for example, the DMRS configuration pattern is initialized per frequency hopping section (e.g., two-slot section or two-Repetition section), so that {pos 2, pos 1} may be applied to each of the frequency hopping sections.

Besides, for example, precoding may be applied to the Repetition. When the precoding is applied to the Repetition, the size of DMRS configuration pattern may be configured to be identical to a section to which the same precoding is applied, and the above-described embodiments may be then applied. For example, the DMRS configuration pattern may be initialized and applied per precoding section.

Figure 23:
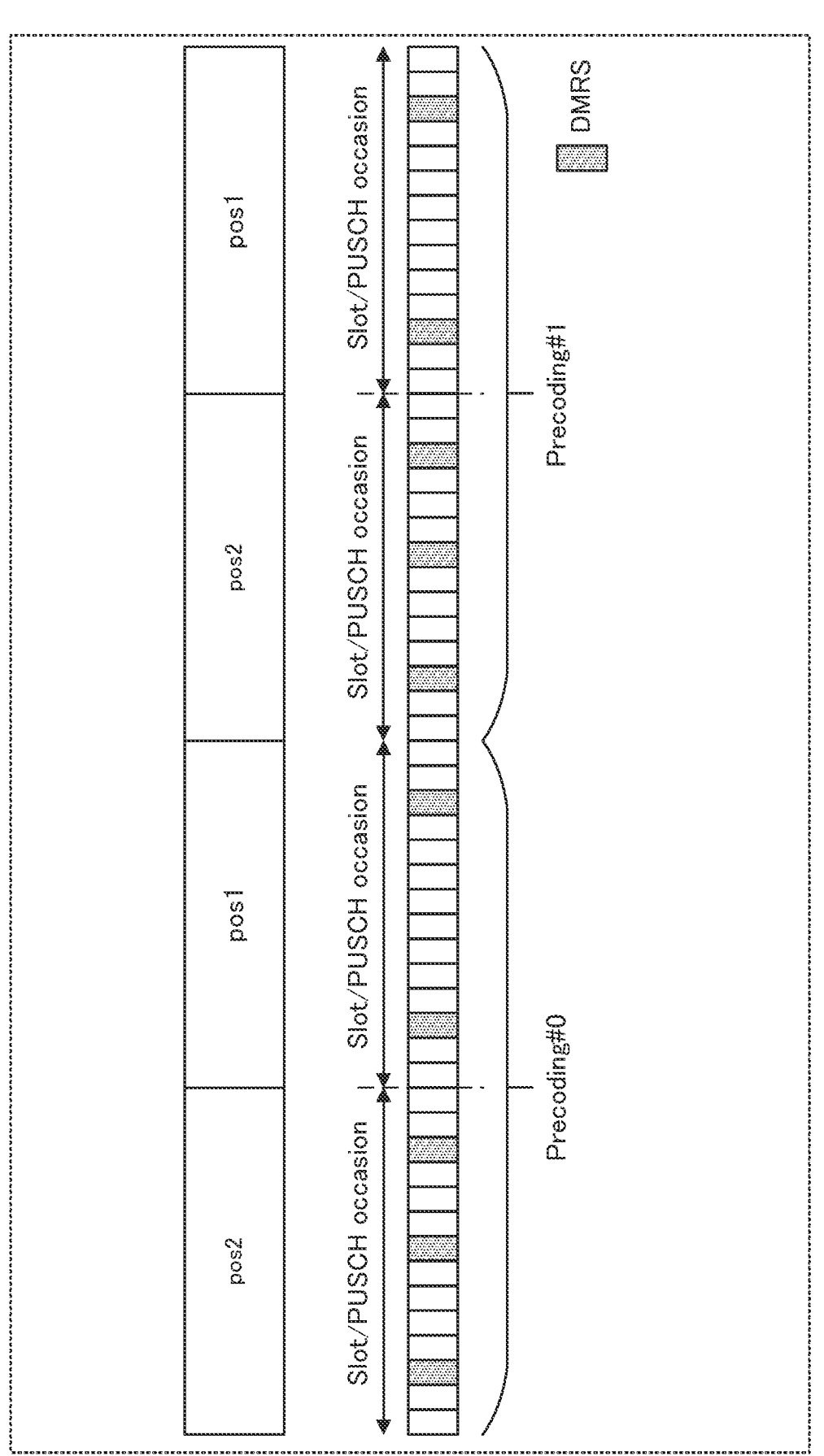
FIG. 23 illustrates an exemplary DMRS configuration in repetition of PUSCH according to still another embodiment.

FIG. 23 illustrates an exemplary DMRS arrangement of a case where the precoding is applied to the Repetition. In FIG. 23, for example, the dmrs-AdditionalPositionPattern indicates {pos 2, pos 1, pos 1, pos 1} to terminal 200. In this situation, in terminal 200, for example, the DMRS configuration pattern is initialized per section to which the same precoding is applied, so that {pos 2, pos 1} may be applied to each of the precoding sections.

Further, for example, in Time Division Duplex (TDD), a signal to be repeated may not only be transmitted in consecutive slots but also may be transmitted between non-consecutive slots. In this case, for example, the inter-slot channel estimation may be applicable between the consecutive slots while the inter-slot channel estimation may not be applied between the non-consecutive slots.

Accordingly, for example, the size of DMRS configuration pattern may be configured to be identical to the number of consecutive slots, and the above-described embodiments may be then applied. In other words, the DMRS configuration pattern may be initialized and applied between non-consecutive slots.

Figure 24:
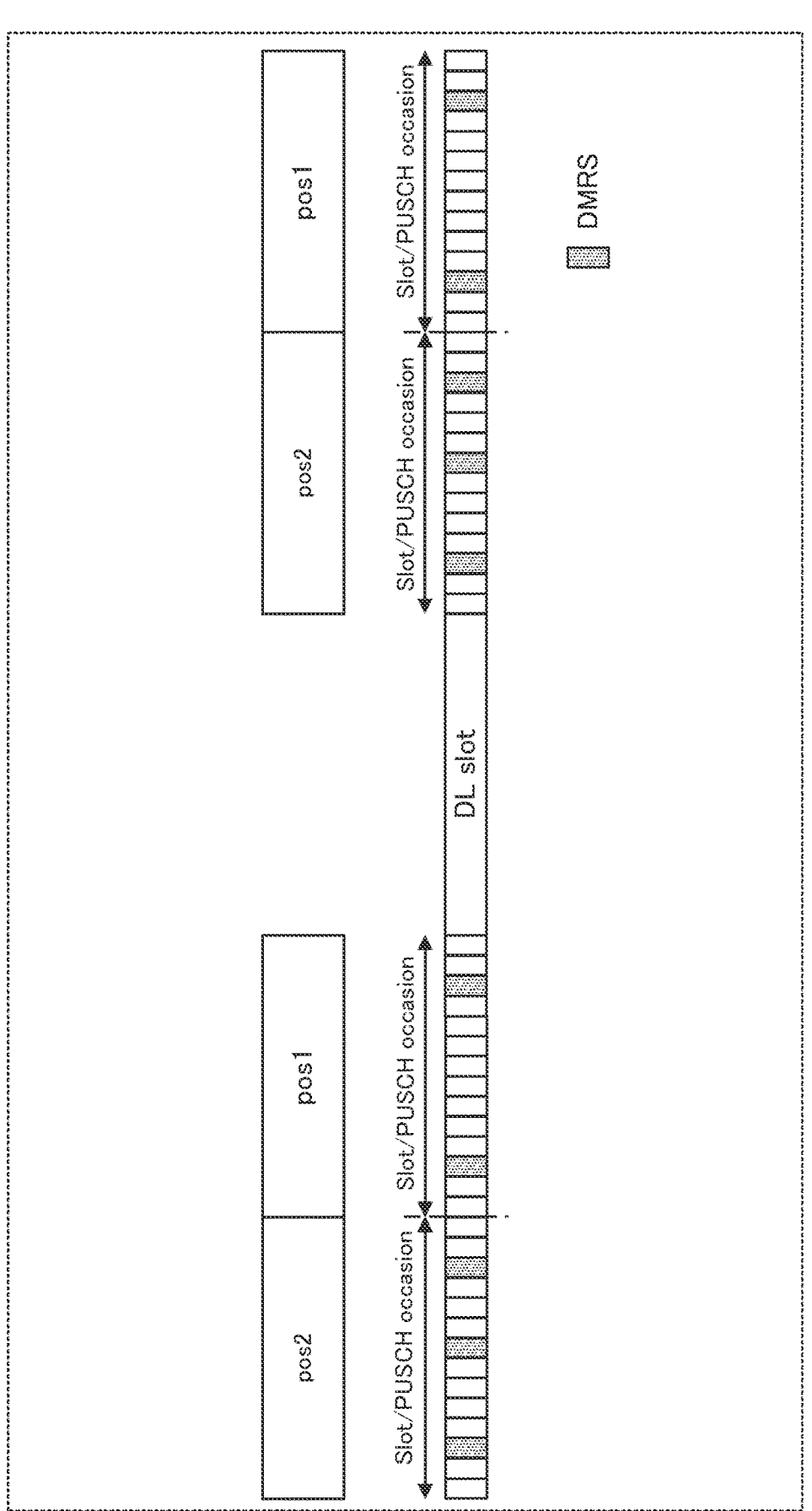
FIG. 24 illustrates an exemplary DMRS configuration in repetition of PUSCH according to yet another embodiment.

FIG. 24 illustrates an exemplary DMRS arrangement of a case where the Repetition including a non-consecutive slot is applied. In FIG. 24, for example, the dmrs-AdditionalPositionPattern indicates {pos 2, pos 1, pos 1, pos 1} to terminal 200. In this situation, in terminal 200, for example, since the DMRS configuration pattern is initialized in the non-consecutive slot, {pos 2, pos 1} may be applied to the first and second Repetition sections and the third and fourth Repetition sections.

Note that the slot section to which the inter-slot channel estimation is applied is not limited to being defined as consecutive or non-consecutive slots, and even between consecutive slots, the number of slots to which the inter-slot channel estimation is applied may be varied (e.g., limited) depending on capability of terminal 200, for example. Therefore, the size of DMRS configuration pattern may be configured to be identical to the slot section to which the inter-slot channel estimation is applied, and the above-described embodiments may be then applied. The slot section to which the inter-slot channel estimation is applied may be configured, for terminal 200, as a slot section in which terminal 200 maintains the continuity of phase of a transmission signal or a slot section in which a transmission power of the transmission signal is constant (e.g., time domain window), for example.

Further, for different frequency hopping sections, different precoding sections, between non-consecutive slots, or slot sections to which different types of inter-slot channel estimation are applied, for example, the same DMRS configuration pattern may be applied, or different DMRS configuration patterns may be applied. When the different DMRS configuration patterns are applied, a dmrs-AdditionalPositionPattern may be individually configured for the different frequency hopping sections, the different precoding sections, between the non-consecutive slots, or the slot sections to which the different types of inter-slot channel estimation are applied.

3. In the above-described embodiments and variations, a description has been given with an example of application to the PUSCH repetition, but the application of the embodiments and variations is not limited to the PUSCH repetition.

In one example, the embodiments and variations may be applied to PUSCH repetition Type A. In this case, the DMRS configuration such as a DMRS arrangement or the number of DMRS symbols may be varied between slots/Repetitions. The embodiments and variations may also be applied to, for example PUSCH repetition Type B. In this case, the DMRS configuration such as a DMRS arrangement or the number of DMRS symbols may be varied between Repetitions.

Further, the embodiments and variations may be applied to, for example, "TB processing over multi-slot PUSCH (TBoMS)" in which transport blocks are mapped to a plurality of PUSCH slots and then transmitted, the introduction of which has been discussed in Rel. 17 (e.g., see NPL 2). In this case, the DMRS configuration such as the DMRS arrangement or the number of DMRS symbols may be varied between slots or in units of PUSCH resources allocated by a start and length indicator value (SLIV). Further, when the Repetition is applied to the TBoMS, the DMRS configuration such as the DMRS arrangement or the number of DMRS symbols may be varied in units of Repetitions in the TBoMS.

Further, the embodiments and variations may be applied to, for example, a PUCCH repetition. In this case, the DMRS configuration such as a DMRS arrangement or the number of DMRS symbols may be varied between slots or between subslots. In addition, when the embodiments and variations are applied to the PUCCH repetition, a parameter corresponding to the above-described "dmrs-AdditionalPositionPattern" may be included in a "PUCCH-FormatConfig" information element that includes a parameter for a PUCCH resource, or the pre-existing parameter "additionalDMRS" may be extended to multiple dimensions.

Further, the embodiments and variations may be applied to, for example, a Msg.3 PUSCH repetition. When the embodiments and variations are applied to the Msg.3 PUSCH repetition, a parameter corresponding to the above-described "dmrs-AdditionalPositionPattern" may be included in an information element that includes a parameter for resource configuration of Msg.3 PUSCH and may be included in, for example, PUSCH-Allocation-CovEnh or Msg3-DMRS-Config-CovEnh.

Further, the embodiments and variations may be applied to, for example, a PDSCH repetition. When the embodiments and variations are applied to the PDSCH repetition, the DMRS configuration such as a DMRS arrangement or the number of DMRS symbols may be varied between slots/Repetitions.

Further, the embodiments and variations may be applied to Semi-Persistent Scheduling (SPS) PDSCH or Configured grant PUSCH, without limitation to a case where terminal 200 receives the DCI to transmit and receive data, for example.

For example, the communication apparatus for transmitting DMRS is not limited to terminal 200 and may be base station 100. Similarly, the communication apparatus for receiving DMRS is not limited to base station 100 and may be terminal 200. In other words, the embodiments or variations may be applied to either one or both of an uplink communication and a downlink communication.

Further, the names of the information elements or the names of the parameters configured for the information elements used in the embodiments or variations are exemplary, and other names may be possible. The values of the parameters described in the embodiments or variations, such as the number of Repetitions, the number of DMRSs, the DMRS length, the DMRS symbol position, and the number of symbols in a slot, are exemplary, and other values may be possible.

In the description of the above-described embodiments, the term such as "part" or "portion" or the term ending with a suffix such as "-er" "-or" or "-ar" may be interchangeably replaced with another term, such as "circuit (circuitry)," "device," "unit," or "module."

(Complements)

Information indicating whether terminal 200 supports the functions, operations, or processes that have been described in the above-mentioned embodiments and variations may be transmitted (or indicated) from terminal 200 to base station 100, as capability information or a capability parameter for terminal 200, for example.

The capacity information may include information elements (IEs) that individually indicate whether terminal 200 supports at least one of the functions, operations, or processes that have been described in the above-mentioned embodiments and variations. Alternatively, the capability information may include information elements that indicate whether terminal 200 supports a combination of any two or more of the functions, operations, or processes that have been described in the above-mentioned embodiments and variations.

Base station 100 may determine (or decide or assume), for example, based on the capability information received from terminal 200, the functions, operations, or processes that are supported (or not supported) by terminal 200, which is a transmission source of the capability information. Base station 100 may execute operations, processes, or control in accordance with a determination result based on the capability information. By way of example, base station 100 may control a repetition transmission in at least one of uplink or downlink, based on the capability information received from terminal 200.

Note that, in a case where terminal 200 does not entirely support the functions, operations, or processes described in the above-mentioned embodiments and variations, such an unsupported part of the functions, operations, or processes may be interpreted as a limitation in terminal 200. For example, information or a request relating to such limitation may be indicated to base station 100.

The information on the capability or the limitation of terminal 200 may be defined by standards or may be implicitly indicated to base station 100 in association with information known in base station 100 or information to be transmitted to base station 100, for example.

(Control Signals)

In the present disclosure, the downlink control signal (information) related to the present disclosure may be a signal (information) transmitted through PDCCH of the physical layer or may be a signal (information) transmitted through a MAC Control Element (CE) of the higher layer or the RRC. The downlink control signal may be a pre-defined signal (information).

The uplink control signal (information) related to the present disclosure may be a signal (information) transmitted through PUCCH of the physical layer or may be a signal (information) transmitted through a MAC CE of the higher layer or the RRC. Further, the uplink control signal may be a pre-defined signal (information). The uplink control signal may be replaced with uplink control information (UCI), the 1st stage sidelink control information (SCI) or the 2nd stage SCI.

(Base Station)

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may serve as a base station. The base station may be a relay apparatus that relays communication between a higher node and a terminal. The base station may be a roadside unit as well.

(Uplink/Downlink/Sidelink)

The present disclosure may be applied to any of uplink, downlink and sidelink. The present disclosure may be applied to, for example, uplink channels, such as PUSCH, PUCCH, and PRACH, downlink channels, such as PDSCH, PDCCH, and PBCH, and side link channels, such as Physical Sidelink Shared Channel (PSSCH), Physical Sidelink Control Channel (PSCCH), and Physical Sidelink Broadcast Channel (PSBCH).

PDCCH, PDSCH, PUSCH, and PUCCH are examples of a downlink control channel, a downlink data channel, an uplink data channel, and an uplink control channel, respectively. PSCCH and PSSCH are examples of a sidelink control channel and a sidelink data channel, respectively. PBCH and PSBCH are examples of broadcast channels, respectively, and PRACH is an example of a random access channel.

(Data Channels/Control Channels)

The present disclosure may be applied to any of data channels and control channels. The channels in the present disclosure may be replaced with data channels including PDSCH. PUSCH and PSSCH and/or control channels including PDCCH, PUCCH, PBCH, PSCCH, and PSBCH.

(Reference Signals)

In the present disclosure, the reference signals are signals known to both a base station and a mobile station and each reference signal may be referred to as a Reference Signal (RS) or sometimes a pilot signal. The reference signal may be any of a DMRS, a Channel State Information—Reference Signal (CSI-RS), a Tracking Reference Signal (TRS), a Phase Tracking Reference Signal (PTRS), a Cell-specific Reference Signal (CRS), and a Sounding Reference Signal (SRS).

(Time Intervals)

In the present disclosure, time resource units are not limited to one or a combination of slots and symbols, and may be time resource units, such as frames, superframes, subframes, slots, time slots, subslots, minislots, or time resource units, such as symbols, Orthogonal Frequency Division Multiplexing (OFDM) symbols, Single Carrier-Frequency Division Multiple Access (SC-FDMA) symbols, or other time resource units. The number of symbols included in one slot is not limited to any number of symbols exemplified in the embodiment(s) described above, and may be other numbers of symbols.

(Frequency Bands)

The present disclosure may be applied to any of a licensed band and an unlicensed band.

(Communication)

The present disclosure may be applied to any of communication between a base station and a terminal (Uu-link communication), communication between a terminal and a terminal (Sidelink communication), and Vehicle to Everything (V2X) communication. The channels in the present disclosure may be replaced with PSCCH, PSSCH, Physical Sidelink Feedback Channel (PSFCH), PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). In addition, the present disclosure may be applied to a network having a large cell size, and a terrestrial network with a large latency compared with a symbol length or a slot length, such as an ultra-wideband transmission network.

(Antenna Ports)

An antenna port refers to a logical antenna (antenna group) formed of one or more physical antenna(s). That is, the antenna port does not necessarily refer to one physical antenna and sometimes refers to an array antenna formed of multiple antennas or the like. For example, it is not defined how many physical antennas form the antenna port, and instead, the antenna port is defined as the minimum unit through which a terminal is allowed to transmit a reference signal. The antenna port may also be defined as the minimum unit for multiplication of a precoding vector weighting.

<5G NR System Architecture and Protocol Stack>3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function)(e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 24 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP. RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding. PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and userexperienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v 15.6.0).

<Functional Split between NG-RAN and 5GC in 5G NR>

Figure 25:
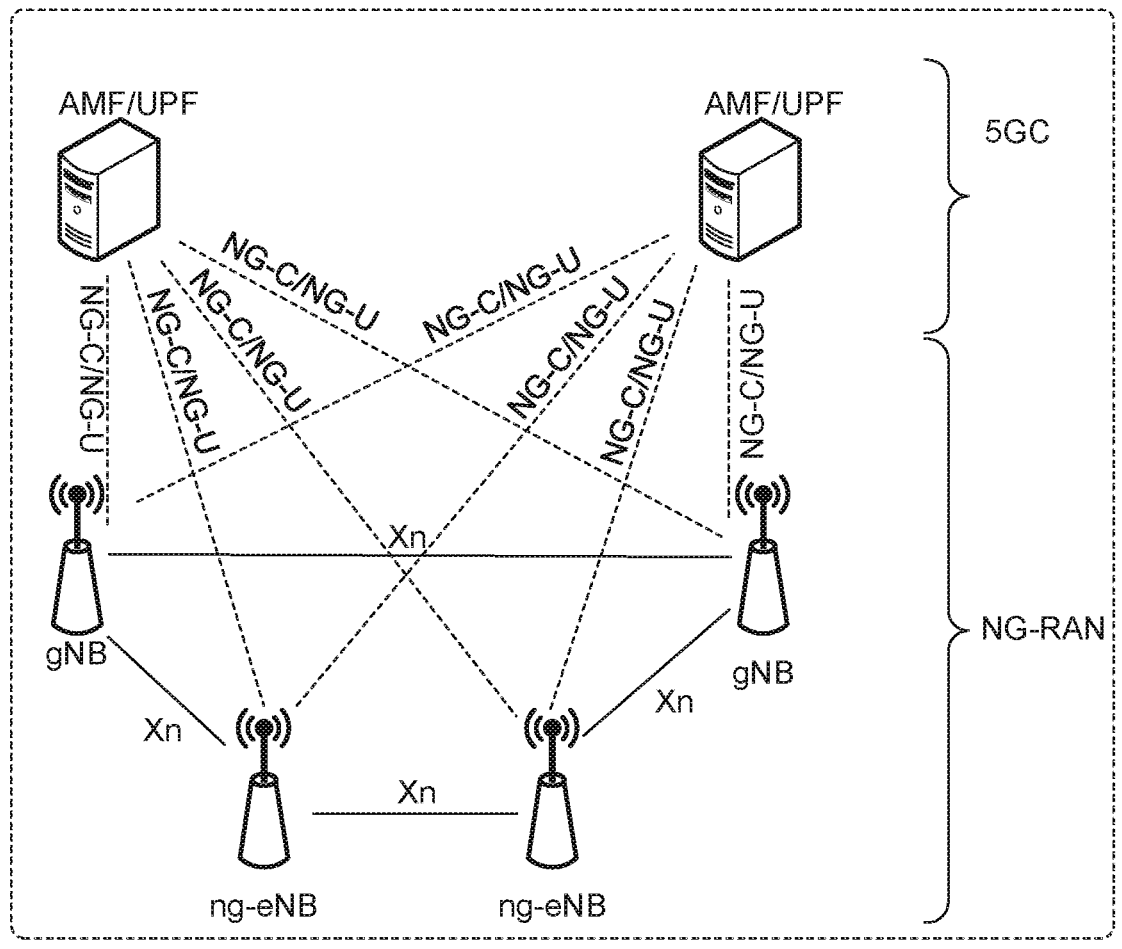
FIG. 25 illustrates an exemplary architecture of a 3GPP NR system.

FIG. 25 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data:

Selection of an AMF during UE attachment in such a case when no routing to an AMF can be determined from the information provided by the UE:

Routing user plane data towards the UPF;

Routing control plane information towards the AMF;

Connection setup and release:

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages:

Radio access network sharing;

Dual connectivity, and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement:

Traffic usage reporting;

Uplink classifier to support routing traffic flows to a data network;

Branching point to support multi-homed PDU session:

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:

Session management;

UE IP address allocation and management,

Selection and control of UPF;

Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 26:
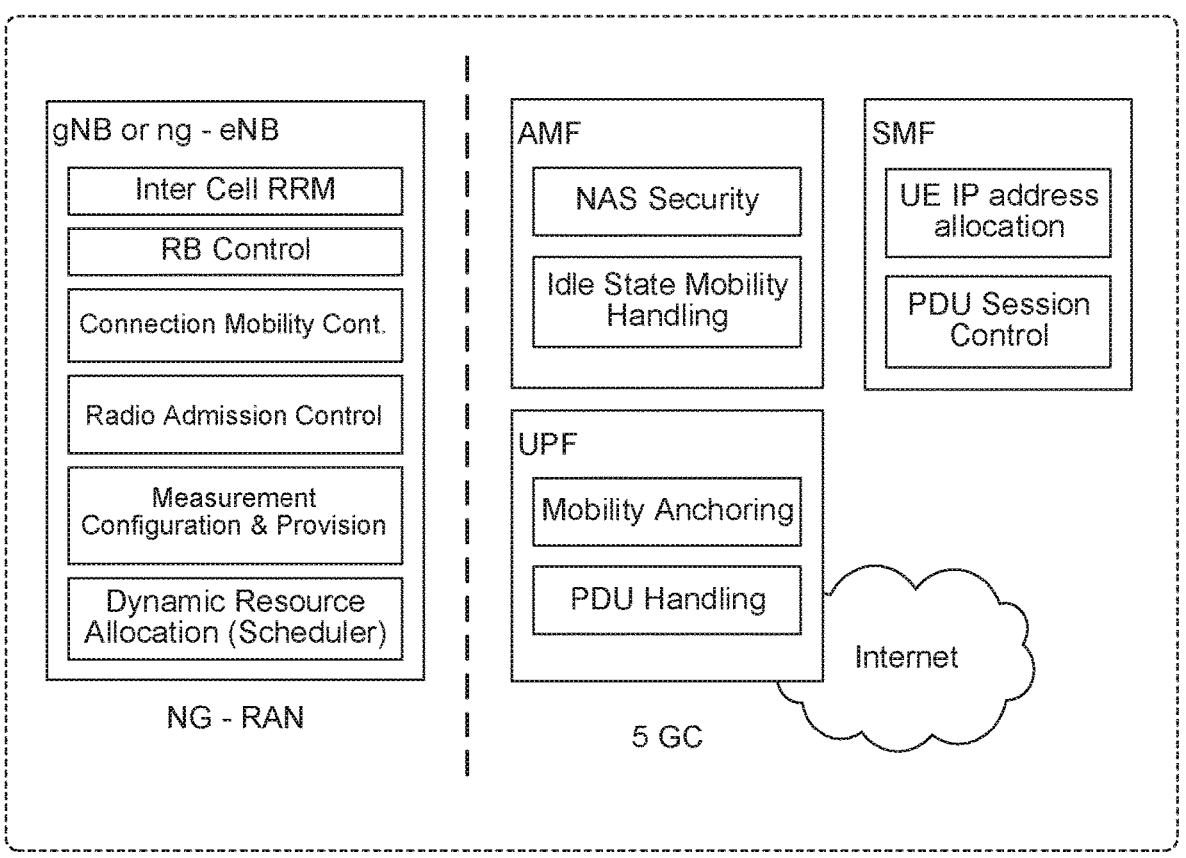
FIG. 26 schematically illustrates a functional split between Next Generation-Radio Access Network (NG-RAN) and 5th Generation Core (5GC)

FIG. 26 illustrates some interactions between a UE, gNB, and AMF (a 5GC Entity) performed in the context of a transition of the UE from RRC_IDLE to RRC_CON-NECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s))

by means of transmitting to the UE the RRCReconfiguration message and, in response, receiving by the gNB the RRCReconfigurationComplete from the UE. For a signaling-only connection, the steps relating to the RRCRecon-figuration are skipped since SRB2 and DRBs are not set up. Finally, the gNB indicates the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 27:
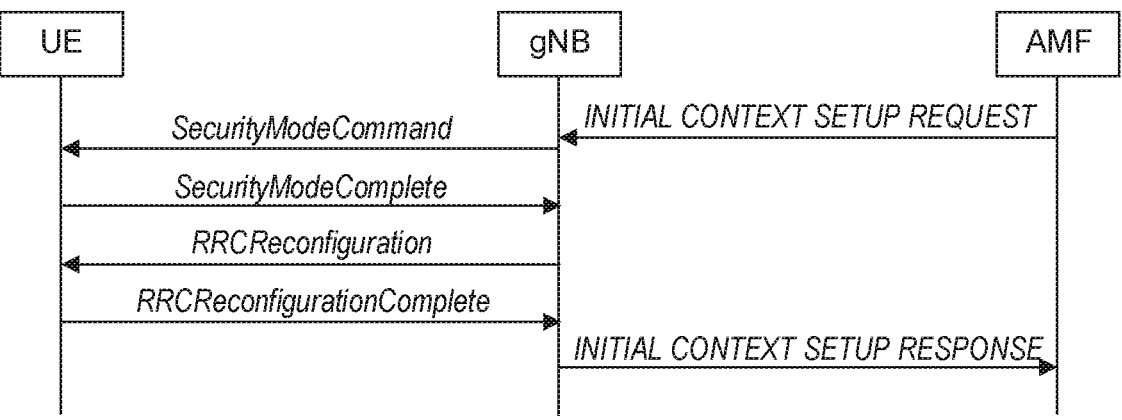
FIG. 27 is a sequence diagram of a Radio Resource Control (RRC) connection setup/reconfiguration procedure.

FIG. 27 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 27 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of IE-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (config-ured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of IE-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI. PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 26. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 28:
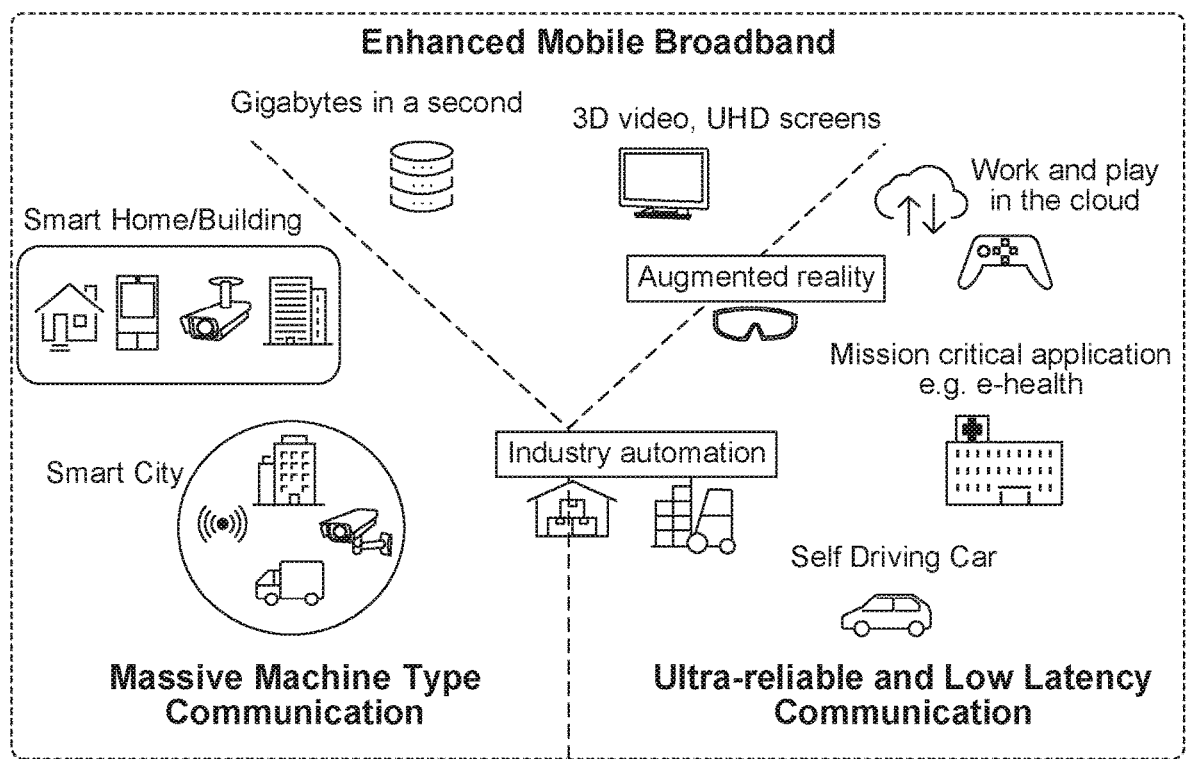
FIG. 28 schematically illustrates usage scenarios of enhanced Mobile BroadBand (eMBB), massive Machine Type Communications (mMTC), and Ultra Reliable and Low Latency Communications (URLLC)

FIG. 28 illustrates a 5G NR non-roaming reference architecture (see TS 23.501 v6.1.0, section 4.23). An Application Function (AF) (e.g., an external application server hosting 5G services, exemplarily described in FIG. 27) interacts with the 3GPP Core Network in order to provide services, for example to support application influencing on traffic routing, accessing Network Exposure Function (NEF) or interacting with the policy framework for policy control (e.g., QoS control) (see Policy Control Function. PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

Figure 29:
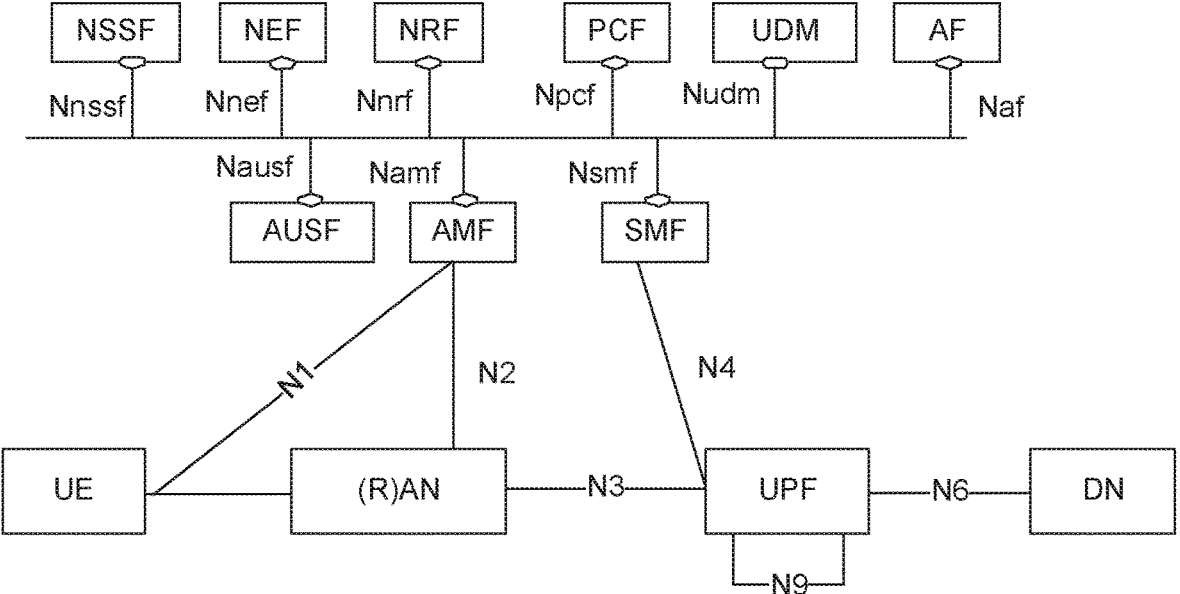
FIG. 29 is a block diagram illustrating an exemplary 5G system architecture for a non-roaming scenario.

FIG. 29 illustrates further functional units of the 5G architecture, namely Network Slice Selection Function (NSSF), Network Repository Function (NRF). Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A communication apparatus according to an exemplary embodiment of the present disclosure includes, control circuitry, which, in operation, makes a configuration of a reference signal to be assigned to a first section for a repetition transmission and a configuration of a reference signal to be assigned to a second section for the repetition transmission different from each other: and transmission circuitry, which, in operation, performs the repetition transmission based on the configurations of the reference signals.

In an exemplary embodiment of the present disclosure, the control circuitry determines the configurations based on an information element including information on patterns of the configurations specific to the first section and the second section, respectively.

In an exemplary embodiment of the present disclosure, the control circuitry determines the configurations based on the information element including information on a plurality of candidates for the patterns and a control signal indicating any one of the plurality of candidates.

In an exemplary embodiment of the present disclosure, the information element is an information element relating to a configuration of a time-domain resource to which a signal for the repetition transmission is assigned.

In an exemplary embodiment of the present disclosure, the control circuitry uses, for the configurations of the reference signals, the information element relating to the configuration of the time-domain resource in preference to an information element relating to the configurations of the reference signals.

In an exemplary embodiment of the present disclosure, the information on the patterns is specific to a type of the repetition transmission.

In an exemplary embodiment of the present disclosure, the information element is an information element relating to the configurations of the reference signals.

In an exemplary embodiment of the present disclosure, a size of at least one of the patterns of the configurations is different from the number of repetition transmissions.

In an exemplary embodiment of the present disclosure, the configurations each include a configuration of at least one of a position, the number of symbols, a type, and/or a signal length of the reference signal in a corresponding one of the first section and the second section.

In an exemplary embodiment of the present disclosure, the configurations include offsets for specified positions of the reference signals in the first section and the second section, respectively.

In an exemplary embodiment of the present disclosure, neither of the configurations is applied to a reference signal to be assigned to a third section for the repetition transmission.

In an exemplary embodiment of the present disclosure, the configurations respectively in the first section and the second section are each a configuration that is specified in Release 15 or Release 16.

A communication apparatus according to an exemplary embodiment of the present disclosure includes; control circuitry, which, in operation, makes a configuration of a reference signal to be assigned to a first section in which reception of a repetition transmission is performed and a configuration of a reference signal to be assigned to a second section in which reception of the repetition transmission is performed different from each other; and reception circuitry, which, in operation, performs the reception of the repetition transmission based on the configurations of the reference signals.

A communication method according to an exemplary embodiment of the present disclosure includes: making, by a communication apparatus, a configuration of a reference signal to be assigned to a first section for a repetition transmission and a configuration of a reference signal to be assigned to a second section for the repetition transmission different from each other; and performing, by the communication apparatus, the repetition transmission based on the configurations of the reference signals.

A communication method according to an exemplary embodiment of the present disclosure includes: making, by a communication apparatus, a configuration of a reference signal to be assigned to a first section in which reception of a repetition transmission is performed and a configuration of a reference signal to be assigned to a second section in which reception of the repetition transmission is performed different from each other; and performing, by the communication apparatus, the reception of the repetition transmission based on the configurations of the reference signals.

The disclosure of Japanese Patent Application No. 2021-057549, filed on Mar. 30, 2021, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A communication apparatus, comprising:
control circuitry, which, in operation, makes a configuration of a reference signal to be assigned to a first section for a repetition transmission and a configuration of a reference signal to be assigned to a second section for the repetition transmission different from each other; and
transmission circuitry, which, in operation, performs the repetition transmission based on the configurations of the reference signals, wherein
the configurations each include a configuration of at least one of a position, the number of symbols, a type, and/or a signal length of the reference signal in a corresponding one of the first section and the second section; and
the control circuitry determines the configurations based on an information element including information on patterns of the configurations specific to the first section and the second section, respectively.

2. The communication apparatus according to claim 1, wherein the control circuitry determines the configurations based on the information element including information on a plurality of candidates for the patterns and a control signal indicating any one of the plurality of candidates.

3. The communication apparatus according to claim 1, wherein the information element is an information element relating to a configuration of a time-domain resource to which a signal for the repetition transmission is assigned.

4. The communication apparatus according to claim 3, wherein the control circuitry uses, for the configurations of the reference signals, the information element relating to the configuration of the time-domain resource in preference to an information element relating to the configurations of the reference signals.

5. The communication apparatus according to claim 1, wherein the information on the patterns is specific to a type of the repetition transmission.

6. The communication apparatus according to claim 1, wherein the information element is an information element relating to the configurations of the reference signals.

7. The communication apparatus according to claim 1, wherein a size of at least one of the patterns of the configurations is different from the number of repetition transmissions.

8. The communication apparatus according to claim 1, wherein the configurations include offsets for specified positions of the reference signals in the first section and the second section, respectively.

9. The communication apparatus according to claim 1, wherein neither of the configurations is applied to a reference signal to be assigned to a third section for the repetition transmission.

10. A communication apparatus, comprising:
control circuitry, which, in operation, makes a configuration of a reference signal to be assigned to a first section in which reception of a repetition transmission is performed and a configuration of a reference signal to be assigned to a second section in which reception of the repetition transmission is performed different from each other; and
reception circuitry, which, in operation, performs the reception of the repetition transmission based on the configurations of the reference signals, wherein
the configurations each include a configuration of at least one of a position, the number of symbols, a type, and/or a signal length of the reference signal in a corresponding one of the first section and the second section; and
the control circuitry determines an information element including information on patterns of the configurations specific to the first section and the second section, respectively.

11. A communication method, comprising:
making, by a communication apparatus, a configuration of a reference signal to be assigned to a first section for a repetition transmission and a configuration of a reference signal to be assigned to a second section for the repetition transmission different from each other; and
performing, by the communication apparatus, the repetition transmission based on the configurations of the reference signals, wherein
the configurations each include a configuration of at least one of a position, the number of symbols, a type, and/or a signal length of the reference signal in a corresponding one of the first section and the second section; and
the configurations are determined based on an information element including information on patterns of the configurations specific to the first section and the second section, respectively.

12. A communication method, comprising:
making, by a communication apparatus, a configuration of a reference signal to be assigned to a first section in which reception of a repetition transmission is performed and a configuration of a reference signal to be assigned to a second section in which reception of the repetition transmission is performed different from each other; and
performing, by the communication apparatus, the reception of the repetition transmission based on the configurations of the reference signals, wherein
the configurations each include a configuration of at least one of a position, the number of symbols, a type, and/or a signal length of the reference signal in a corresponding one of the first section and the second section; and
determining an information element including information on patterns of the configurations specific to the first section and the second section, respectively.

* * * * *